United States Patent
Nimura

(10) Patent No.: US 9,354,467 B2
(45) Date of Patent: May 31, 2016

(54) ELECTRO-OPTICAL DEVICE AND ELECTRONIC APPARATUS

(71) Applicant: Seiko Epson Corporation, Tokyo (JP)

(72) Inventor: Toru Nimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 138 days.

(21) Appl. No.: 14/081,582

(22) Filed: Nov. 15, 2013

(65) Prior Publication Data

US 2014/0152908 A1   Jun. 5, 2014

(30) Foreign Application Priority Data

Dec. 3, 2012   (JP) .................................. 2012-264023

(51) Int. Cl.
*G02F 1/1335* (2006.01)
*G02B 3/00* (2006.01)

(52) U.S. Cl.
CPC ........ *G02F 1/133526* (2013.01); *G02B 3/0056* (2013.01)

(58) Field of Classification Search
None
See application file for complete search history.

(56) References Cited

U.S. PATENT DOCUMENTS

| 5,771,085 A * | 6/1998 | Ochi et al. ..................... 349/158 |
| 2005/0128595 A1* | 6/2005 | Shimizu ....................... 359/619 |
| 2011/0109818 A1* | 5/2011 | Uneda et al. ..................... 349/5 |

FOREIGN PATENT DOCUMENTS

| JP | 05-150103 A | 6/1993 |
| JP | 09-101401 A | 4/1997 |
| JP | 2001-042105 A | 2/2001 |
| JP | 2003-139915 A | 5/2003 |
| JP | 2007-335723 A | 12/2007 |
| JP | 2010-169807 A | 8/2010 |

* cited by examiner

*Primary Examiner* — Richard Kim
(74) *Attorney, Agent, or Firm* — ALG Intellectual Property, LLC

(57) ABSTRACT

A microlens array substrate is provided on which a plurality of microlenses is arranged, and the collection efficiency of a first microlens is lower than the collection efficiency of a second microlens positioned further to the outside edge sides than the first microlens.

9 Claims, 13 Drawing Sheets

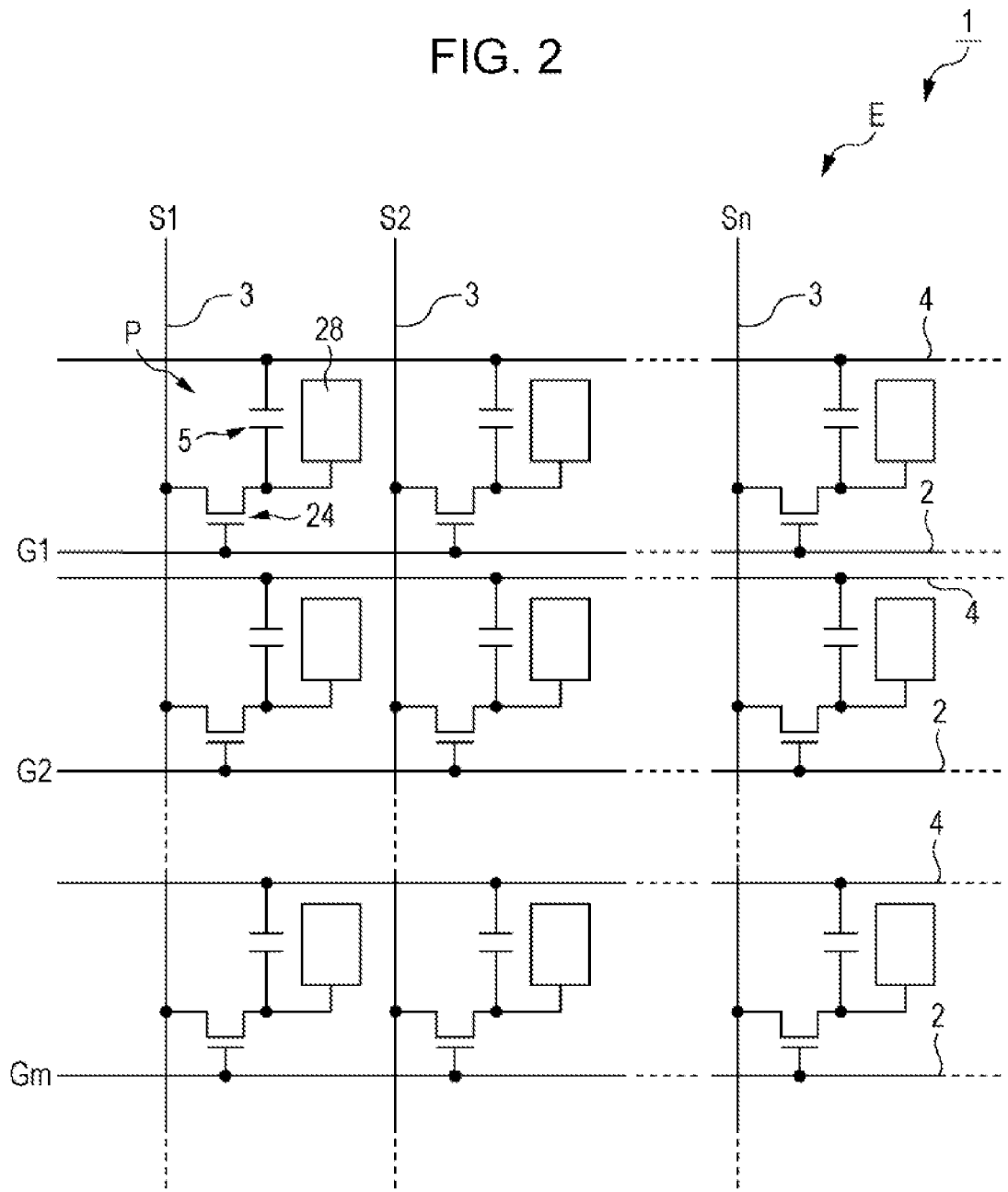

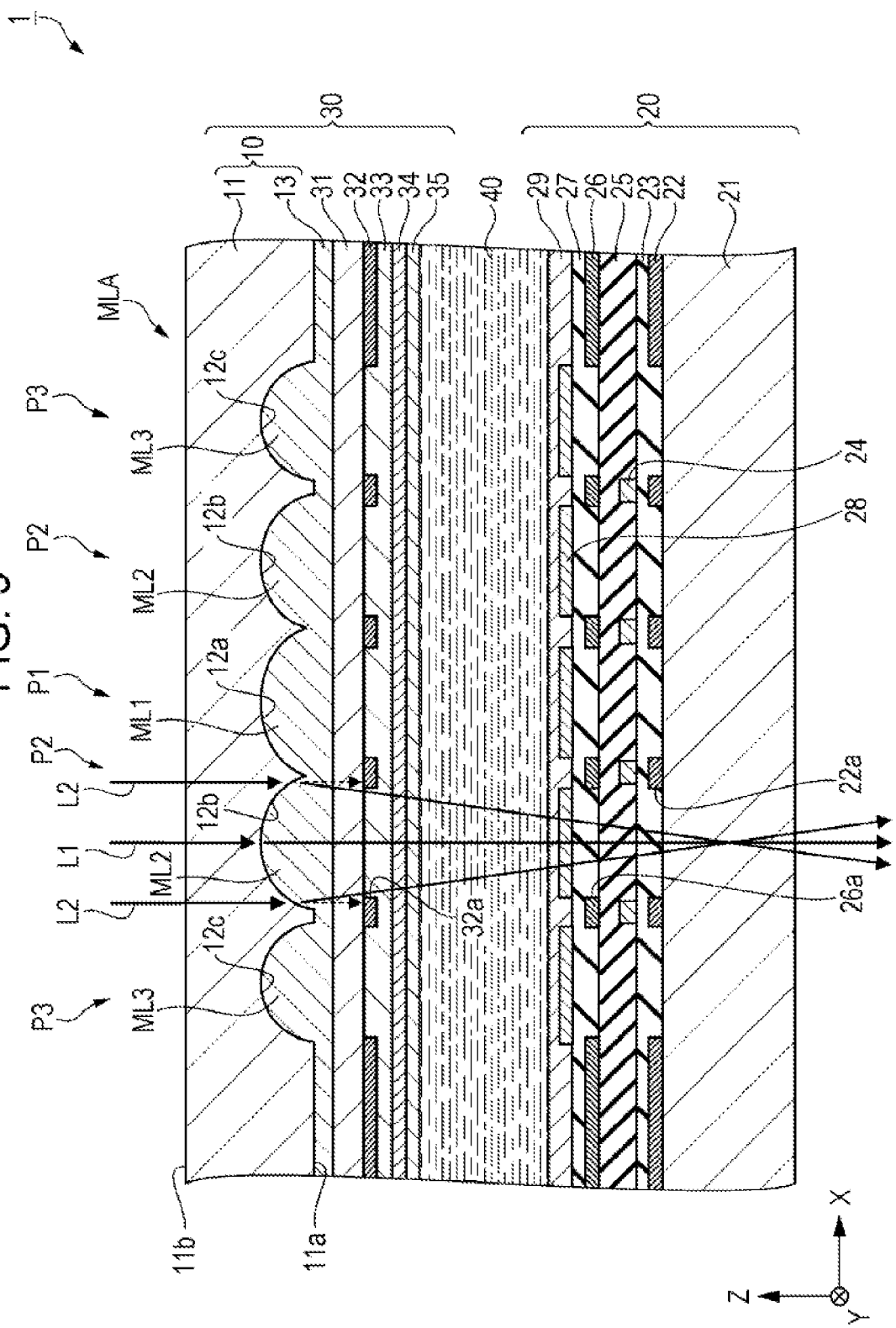

ELECTRO-OPTICAL DEVICE AND ELECTRONIC APPARATUS

BACKGROUND

1. Technical Field

The present invention relates to, for example, an electro-optical device and an electronic apparatus.

2. Related Art

An electro-optical device is known which includes an electro-optical medium (for example, a liquid crystal or the like) between an element substrate and a counter substrate. Examples of the electro-optical device include, for example, a liquid crystal device used in a liquid crystal light valve of a projector. In such a liquid crystal device, there is demand for realizing a high optical utilization efficiency.

Thereby, for example, a configuration is known which collects light incident on a liquid crystal device by including a microlens array substrate on at least one of an element substrate and a counter substrate of the liquid crystal device and achieves a substantial improvement in the aperture ratio of the liquid crystal device. The microlens array substrate includes a substrate formed from quartz or the like with a plurality of concavities formed in the surface thereof and a lens layer having a refractive index different from the base material which is formed so as to be embedded in the concavities covering the substrate (for example, refer to JP-A-9-101401).

In the microlens array substrate disclosed in JP-A-9-101401, a mask layer (polycrystalline silicon film) is formed on a substrate formed from quartz or the like, and an opening is formed in the mask layer corresponding to a part on which the microlens (concavity) is to be formed. Then, a substantially spherical plane shaped concavity is formed by subjecting the substrate to wet etching via an opening in the mask layer. Because each opening in the mask layer is formed with a substantially uniform size, concavities with substantially the same shape are formed in the microlens array substrate.

SUMMARY

Incidentally, in a case using a liquid crystal device including such a microlens array substrate as a liquid crystal light valve in a projector, there is a problem in that an image projected on a screen is not formed with a uniform brightness and the outer edge sides become darker than the center portion. A case is considered in which the angle of incidence of light incident on the projection lens is different between the center portion and the outer edge sides and differences in vignetting in the projection lens occur because the angle of incidence of light incident on the liquid crystal light valve is different between the center portion and the outer edge sides as a cause. In addition, a case is considered in which differences in illuminance occur through position dependence of engulfing of the light on the projection lens passing through the liquid crystal light valve, even if the angle of incidence of light incident on the liquid crystal light valve is uniform between the center portion and the outer edge sides. Therefore, there is demand for a microlens array substrate able to make the illuminance of an image projected on a screen more uniform between the center portion and the outer edge sides.

The invention can realized in the following forms or application examples.

Application Example 1

According to this application example, there is provided a microlens array substrate on which a plurality of microlenses is arranged, in which the collection efficiency of a first microlens is lower than the collection efficiency of a second microlens positioned further to the outside edge side than the first microlens.

According to the configuration of the application example, the collection efficiency of the first microlens is lower than the collection efficiency of the second microlens positioned further to the outside edge of the first microlens. Here, the collection efficiency of the microlens being small signifies, for example, a small degree to which light is collected in the center portion of the microlens by light incident on the microlens being refracted, in a case of using a microlens array substrate in a liquid crystal light valve (liquid crystal display device) of a projector. Therefore, for example, in a case of using a microlens array substrate in a liquid crystal light valve of a projector, the amount of light collected with the first microlens and passing through without being blocked by the light blocking layer blocking light to a driving element, such as a TFT, is smaller than that of the second microlens. In so doing, since the amount of light passing through the inner side of the microlens array substrate is smaller than the amount of light passing through the outer edge side, it is possible to make the illuminance of an image projected on a screen more uniform between the inner side and the outer edge side, compared to a configuration of the related art with a higher illuminance in the inner side than the outer edge side.

Application Example 2

In the microlens array substrate according to the application example, it is preferable that the curvature of the first microlens be smaller than the curvature of the second microlens.

According to the configuration of the application example, the curvature of the first microlens is smaller than the curvature of the second microlens. That is, since the condition of curving of the concavity of the first microlens when viewed in cross-section is gentler than the degree of curving of the concavity of the second microlens, the collection efficiency of the first microlens positioned on the inner side is lower than the collection efficiency of the second microlens positioned to the outer edge side.

Application Example 3

In the microlens array substrate according to the application example, it is preferable that the diameter of the first microlens be smaller than the diameter of the second microlens.

According to the configuration of the application example, since the diameter of the first microlens is smaller than the diameter of the second microlens, the effective area with which the first microlens is able to collect light with respect to incident light incident on the same area on the microlens array substrate is smaller than the effective area with which the second microlens is able to collect light. Accordingly, the collection efficiency of the first microlens positioned to the inner side is lower than the collection efficiency of the second microlens positioned to the outer edge side.

Application Example 4

In a microlens array substrate according to the application example, it is preferable that the inclination angle with respect to the one surface of a peripheral edge portion of the first microlens be smaller than the inclination angle with respect to the one face of the peripheral edge portion of the second microlens.

According to the configuration of the application example, since the inclination angle with respect to one face of the peripheral edge portion of the first microlens is smaller than the inclination angle with respect to one face of the peripheral edge portion of the second microlens, light refracted by the peripheral edge portion of the first microlens is concentrated on a position further separated from the center portion of the microlens than the light refracted by the peripheral edge portion of the second microlens. Accordingly, the collection efficiency of the first microlens positioned to the inner side is lower than the collection efficiency of the second microlens positioned to the outer edge side.

Application Example 5

According to this application example, there is provided an electro-optical device including an element substrate having switching element and a light blocking layer blocking light to the switching element, a counter substrate arranged opposing the element substrate, and a liquid crystal layer interposed between the element substrate and the counter substrate, and includes the above microlens array substrate on at least one of the element substrate and the counter substrate.

According to the configuration of the application example, since the electro-optical device includes a microlens array substrate in which the amount of light passing through the inner side is lower than the amount of light passing through the outer edge side, it is possible to make the illuminance of an image projected on a screen more uniform between the inner side and the outer edge sides, in a case of being used as a liquid crystal light valve in a projector.

Application Example 6

In the electro-optical device according to the application example, it is preferable that the electro-optical device have a display region and a non-display region surrounding the display region, the microlens array substrate have a first microlens and a second microlens arranged corresponding to the display region, and a third microlens arranged corresponding to the non-display region, and the shape of the third microlens be the same as the shape of the second microlens.

According to the configuration of the application example, a third microlens is provided in the non-display region surrounding the periphery of the display region that contributes to display. Since the shape of the third microlens is the same as the shape of the second microlens positioned at the outer edge side of the display region, it is possible for the layer thickness of the liquid crystal layer for improving the flatness to be more uniform in the outer edge portion of the display region of the microlens array substrate and the periphery thereof, and since it is possible for the optical conditions such as the refraction of incident light to be the same, it is possible for the image quality of the electro-optical device to be improved.

Application Example 7

In the electro-optical device according to the application example, it is preferable that the electro-optical device include the microlens array substrate on the counter substrate, and include a microlens array substrate on which microlenses having the same collection efficiency as one another are arranged on the element substrate.

According to the configuration of the application example, since a microlens array substrate is included on the counter substrate, the collection efficiency in the inner side with respect to light incident from the counter substrate side is lower than the collection efficiency in the outer edge side. Therefore, since the degree of inclination of the optical axis smaller on the inner side compared to the outer edge sides among the light incident on the liquid crystal layer from the counter substrate, in a case in which the electro-optical device is used as a liquid crystal light valve of a projector, it is possible for the contrast of an image projected on a screen to be more uniform between the inner side and the outer edge sides.

Application Example 8

In the electro-optical device according to the application example, it is preferable that the electro-optical device include the microlens array substrate on the element substrate, and include a microlens array substrate on which microlenses having the same collection efficiency as one another are arranged on the counter substrate.

According to the configuration of the application example, a microlens array substrate on which microlenses having the same collection efficiency as one another at both the center portion and the outer edge sides are arranged is included on the counter substrate. Therefore, if the collection efficiency with respect to light incident from the counter substrate side is similarly increased in both the inner side and the outer edge sides, it is possible to similarly reduce the amount of light blocked by the light blocking layer with respect to light incident on the element substrate by passing through the liquid crystal layer from the counter substrate for both the inner side and the outer edge sides. In so doing, since it is possible to reduce the amount of light absorbed by the light blocking layer between the inner side and the outer edge sides, it is possible to suppress the heat generated by the light blocking layer due to absorbing light.

Application Example 9

In the electro-optical device according to the application example, it is preferable that the electro-optical device include the microlens array substrate on and a microlens array substrate on which microlenses having the same collection efficiency as one another are arranged on the counter substrate.

According to the configuration of the application example, both microlens array substrates are included on the counter substrate, and a microlens array substrate is not included on the element substrate. In a case in which the configuration includes a microlens array substrate on the element substrate, there are cases in which the yield is lowered by cracks occurring in the microlens due to the microlens array substrate being exposed to high temperatures during a step forming a switching element on the microlens array substrate. In contrast, by including both microlens array substrates on the counter substrate, it is possible to suppress lowering of the yield due to the occurrence of cracks in such a microlens.

Application Example 10

According to this application example, there is provided electronic apparatus including the electro-optical device of the above application example.

According to the configuration of the present application example, it is possible to provide an electronic apparatus able to make the illuminance of an image projected on a screen more uniform between the center portion and the outer edge sides.

BRIEF DESCRIPTION OF THE DRAWINGS

The invention will be described with reference to the accompanying drawings, wherein like numbers reference like elements.

FIG. 2 is an equivalent circuit diagram showing an electrical configuration of a liquid crystal device according to the first embodiment.

FIG. 3 is a schematic cross-sectional view showing a configuration of a liquid crystal device according to the first embodiment.

DESCRIPTION OF EXEMPLARY EMBODIMENTS

Figure 1:
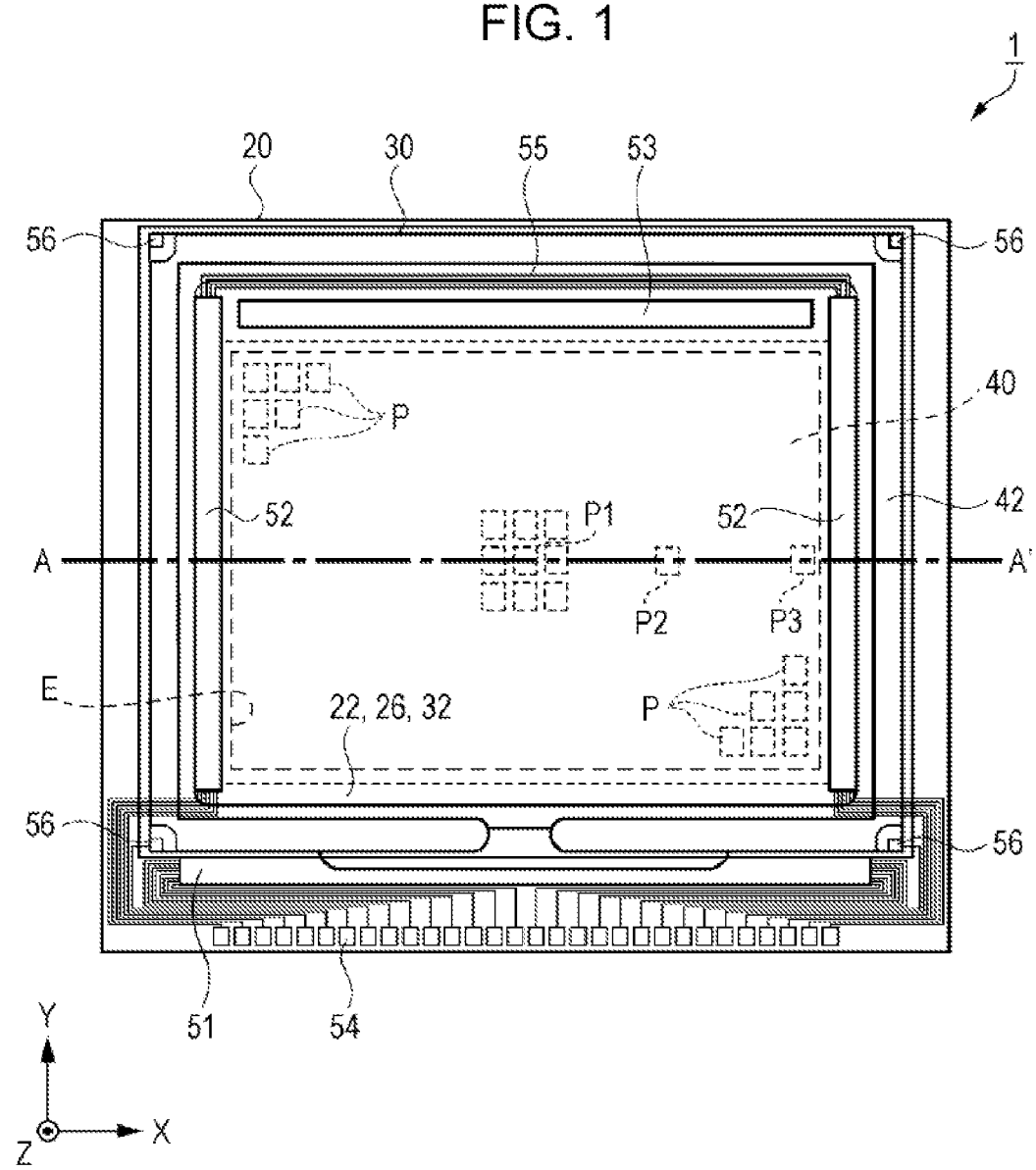
FIG. 1 is a schematic plan view showing a configuration of a liquid crystal device according to a first embodiment.

Hereinafter, specific embodiments of the present invention will be described with reference to the drawings. Moreover, the drawings to be used are displayed after enlarging or reducing as appropriate in order that the portions to be described are recognizable. In addition, there are cases in which elements other than the constituent elements necessary to the description are not shown in the drawings.

Moreover, in the following forms, for example, a case where "on a substrate" is disclosed indicates a case where arrangement is performed so as to contact the top of the substrate, a case where arrangement is performed via another constituent component on top of the substrate, and a case where a part is arranged so as to contact the top of the substrate, and a part is arranged via another constituent component.

First Embodiment

Electro-Optical Device

Here, as the electro-optical device, an active matrix-type liquid crystal device including a thin film transistor (TFT) as a switching element of a pixel will be described as an example. The liquid crystal device is able to be suitably used as a light modulating element (liquid crystal light valve) of a projection-type display device (projector) described later.

Firstly, a liquid crystal device as an electro-optical device according to the first embodiment will be described with reference to FIGS. 1, 2 and 3. FIG. 1 is a schematic plan view showing a configuration of a liquid crystal device according to a first embodiment. FIG. 2 is an equivalent circuit diagram showing an electrical configuration of a liquid crystal device according to the first embodiment. FIG. 3 is a schematic plan view showing a configuration of a liquid crystal device according to the first embodiment. More specifically, FIG. 3 is a schematic cross-sectional view taken along line A-A' in FIG. 1.

As shown in FIGS. 1 and 3, the liquid crystal device 1 according to the first embodiment has an element substrate 20 and a counter substrate 30 arranged opposing each other, and a liquid crystal layer 40 arranged between the element substrate 20 and the counter substrate 30. As shown in FIG. 1, the element substrate 20 is slightly larger than the counter substrate 30, and both substrates are bonded via a sealing material 42 arranged in a frame shape.

The liquid crystal layer 40 is sealed in a space surrounded by the element substrate 20, the counter substrate 30, and a sealing material 42, and is configured from a liquid crystal having positive or negative dielectric anisotropy. The sealing material 42 is formed from, for example, an adhesive such as a thermosetting or ultraviolet curable epoxy resin. A spacer (not shown in the drawing) is mixed into the sealing material 42 for holding the gap to be fixed between the element substrate 20 and the counter substrate 30.

A light blocking layer 22 (26, 32) having a frame-shaped peripheral edge portion is provided at the inner side of the sealing material 42. The light blocking layer 22 (26, 32) is formed from, for example, a metal or metal oxide with light blocking properties. The inner side of the light blocking layer 22 (26, 32) forms a display region E in which a plurality of pixels P is arranged. The display region E is a region substantially contributing to display in a liquid crystal device 1. The light blocking layer 22 (26, 32) is provided in, for example, in lattice pattern in the display region so as to planarly partition the plurality of pixels P.

The pixels P, for example, have a substantially rectangular shape and are arranged in a matrix pattern. Among the plurality of pixels P arranged in the display region E, a pixel P positioned in the center portion of the display region E is set as pixel P1. In addition, a pixel P positioned furthest to the outer edge side of the display region E in the direction of the line A-A' is set as the pixel P3, and pixel P positioned between the pixel P1 and the pixel P3 in the direction of the line A-A' is set as the pixel P2.

On the outside of the sealing material 42 of one side portion of the element substrate 20, a data line driving circuit 51 and a plurality of external connection terminals 54 are provided along the one side portion. In addition, an inspection circuit 53 is provided on the inner side of the sealing material 42 along another side portion opposite the one side portion. Furthermore, a scanning line driving circuit 52 is provided on the inner side of the sealing material 42 along another two opposing side portions orthogonal to these two side portions.

A plurality of wirings 55 joining two scanning line driving circuits 52 is provided on the inner side of the sealing material 42 of the one side portion on which the inspection circuit 53. The wirings joining the data line driving circuit 51 and the scanning line driving circuit 52 are connected to a plurality of external connection terminals 54. In addition, a vertical conduction portion 56 for electrically conducting between the element substrate 20 and the counter substrate 30 is provided in the corner portion of the counter substrate 30. Moreover, the arrangement of the inspection circuit 53 is not limited thereto, and may be provided at a position along the inner side of the sealing material 42 between the data line driving circuit 51 and the display region E.

In the description below, a direction along one side portion on which the data line driving circuit 51 is provided is set to the X direction as a first direction, and a direction along another two opposing side portions orthogonal to the first side portion is set to the Y direction as a second direction. The X direction is the direction along the line A-A' in FIG. 1. In addition, the direction facing upwards in FIG. 1 and orthogonal to the X direction and the Y direction is set to the Z direction. Moreover, in the present specification, viewing from the normal line direction (Z direction) of the surface 11b (refer to FIG. 3) of the counter substrate 30 of the liquid crystal device 1 is referred to as "plan view".

As shown in FIG. 2, in the display region E, scanning lines 2 and data line 3 are formed so as to intersect each other, and pixels P are provided corresponding to the intersections of the scanning lines 2 and the data lines 3. Each of the pixels P is provided with a pixel electrode 28 and a thin film transistor 24 (TFT) as a switching element.

The source electrode (not shown) of the TFT 24 is electrically connected to the data line 3 extending from the data line driving circuit 51. Image signals (data signals) S1, S2, . . . , Sn are provided in line sequence from the data line driving circuit 51 (refer to FIG. 1) to the data lines 3. The gate electrode (not shown) of the TFT 24 is a portion of the scanning line 2 extending from the scanning line driving circuit 52. Scanning signals G1, G2, . . . , Gm are provided in line sequence from the scanning line driving circuit 52 to the scanning lines 2. The drain electrode (not shown) of the TFT 24 is electrically connected to the pixel electrode 28.

The image signals S1, S2, . . . Sn are written to the pixel electrode 28 via the data lines 3 at a predetermined timing by setting the TFT 24 to the on state for a fixed time only. The predetermined level image signal written in this way to the liquid crystal layer 40 via the pixel electrode 28 is held for a fixed time by a liquid crystal layer capacitor formed between shared electrodes 34 (refer to FIG. 3) provided on the counter substrate 30.

Moreover, storage capacitors 5 are formed between the capacitance lines 4 and the pixel electrodes 28 formed along the scanning lines 2 and arranged in parallel to a liquid crystal capacitor in order to prevent leaking of the held image signals S1, S2, . . . , Sn. In this way, if a voltage signal is applied to the liquid crystal of each pixel P, the alignment state of the liquid crystal changes according to the voltage level applied. In so doing, gradient display by modulating light incident on the liquid crystal layer 40 (refer to FIG. 3) is possible.

The liquid crystal configuring the liquid crystal layer 40 modulates light by changing the alignment or order of the molecular association according to the voltage level applied, and enables gradient display. For example, in the case of normally white mode, the transmissivity with respect to incident light according to the voltage applied by each unit of the pixels P reduces. In the case of normally black mode, the transmissivity with respect to incident light according to the voltage applied by each unit of the pixels P increases, and light having contrast according to the image signal is emitted from the liquid crystal device 1 as a whole.

As shown in FIG. 3, the element substrate 20 includes a substrate 21, a light blocking layer 22, an insulating layer 23, a TFT 24, an insulating layer 25, a light blocking layer 26, an insulating layer 27, a pixel electrode 28 and an alignment film 29. The substrate 21 is formed from a material having optical transparency, such as, for example, glass or quartz.

The light blocking layer 22 is formed in a lattice pattern so as to overlap the upper layer of the light blocking layer 26 in plan view (refer to FIG. 3). The light blocking layers 22, 26 are configured by a material having light blocking properties, such as, for example, Mo (molybdenum), W (tungsten), Ti (titanium), TiN (titanium nitride) or Cr (chromium).

The light blocking layer 22 and the light blocking layer 26 are arranged so as to interpose the TFT 24 therebetween in the thickness direction (Z direction) of the element substrate 20. The incidence of light to the TFT 24 is suppressed by the light blocking layer 22 and the light blocking layer 26 begin provided. The region (inside opening portions 22a, 26a) surrounded by the light blocking layers 22 and 26 is a region light passes through.

The insulating layer 23 is provided so as to cover the substrate 21 and the light blocking layer 22. The insulating layer 23, for example, is formed from an inorganic material such as $SiO_2$. The TFT 24 is provided on the insulating layer 23. The TFT 24 is a switching element driving the pixel electrode 28. Although not shown in the drawings, the TFT 24 is configured from a semiconductor layer, a gate electrode, source electrode and a drain electrode.

The gate electrode is formed via a portion (gate insulating film) of the insulating layer 25 in the region overlapping the channel region of the semiconductor layer in the element substrate 20 in plan view. Although not shown in the drawings, the gate electrode is electrically connected to the scanning line 2 (refer to FIG. 2) arranged on the lower layer side via a contact hole, and the TFT 24 is controlled to be on or off by a scanning signal being applied.

The insulating layer 25 is provided so as to cover the insulating layer 23 and the TFT 24. The insulating layer 25, for example, is formed from an inorganic material such as $SiO_2$. The insulating layer 25 includes a gate insulating film insulating between the semiconductor layer of the TFT 24 and the gate electrode. The concavities and convexities of the surface arising due to the TFT 24 are moderated due to the insulating layer 25. The light blocking layer 26 is provided on the insulating layer 25. Then, an insulating layer 27 formed from an inorganic material is provided so as to cover the insulating layer 25 and the light blocking layer 26.

A pixel electrode 28 is provided on the insulating layer 27 corresponding to the pixel P. The pixel electrode 28 is arranged in a region overlapping the opening portion 22a of the light blocking layer 22 and the opening portion 26a of the light blocking layer 26 in plan view. The pixel electrode 28 is formed from a transparent conductive film, such as, for example, ITO (Indium Tin Oxide) or IZO (Indium Zinc Oxide). The alignment film 29 is provided so as to cover the pixel electrode 28.

Moreover, the TFT 24, the electrodes supplying electrical signals to the TFT 24, or the wirings (not shown) of the scanning lines 2 and data lines 3 or the like are provided in the region overlapping the light blocking layer 22 and the light blocking layer 26 in plan view. TFTs 24, for example, are provided, for example, at the intersection points of the lattice of the light blocking layer 22 and the light blocking layer 26, that is, the four corners of the pixels P. Moreover, the electrodes or wirings and the like may have a configuration doubling as the light blocking layer 22 and the light blocking layer 26.

The counter substrate 30 includes a microlens array substrate 10, a pass layer (optical path length-adjusting layer) 31, a light blocking layer 32, a protective layer 33, a common electrode 34, and an alignment film 35. The microlens array substrate 10 is arranged such that the opening portion side of the concavity 12 (concavities 12a, 12b, 12c) opposes the element substrate 20. The microlens array substrate 10 includes a substrate 11 and a lens layer 13. The substrate 11 is formed from a material having optical transparency, such as, for example, glass or quartz.

The substrate 11 has a plurality of concavities 12 (concavities 12a, 12b, 12c) formed on one face 11a of the liquid crystal layer 40 side. The concavity 12a positioned to the inner side (center portion) in the direction of the line A-A' of the one face 11a of the substrate 11 is provided corresponding to the pixel P1. In addition, the concavity 12c positioned furthest to the outer edge side is provided corresponding to the pixel P3, and the concavity 12b positioned between the concavity 12a and the concavity 12c is provided corresponding to the pixel P2.

Moreover, although concavities 12 other than the concavities 12a, 12b, and 12c are not shown in the drawing in FIG. 3, concavities 12 are provided in the substrate 11 corresponding to each of the pixels P shown in FIG. 1. Below, descriptions common to the concavities 12a, 12b, and 12b are simply denoted as concavity 12.

The concavities 12a, 12b, and 12c are formed with a curved plane shape tapering towards the bottom portion thereof; however, the concavities do not have a spherical plane shape (hemispherical shape), and are not a similar shape to one another. However, it is possible for the shape of the concavities 12a, 12b, and 12c to approximate a semi-circular shape in cross-sectional view as shown in FIG. 3. The radius of curvature when the shape of the concavity 12a approximates a semi-circular shape is greater than the radius of curvature when the shape of the concavity 12b approximates a semi-circular shape. In addition, the radius of curvature when the shape of the concavity 12b approximates a semi-circular shape is greater than the radius of curvature when the shape of the concavity 12c approximates a semi-circular shape.

Accordingly the curvature of the concavity 12a is smaller than the curvature of the concavity 12b, and the curvature of the concavity 12b is smaller than the curvature of the concavity 12c. That is, the bending condition of the curved surface of the concavities 12a, 12b, and 12c when approximating a semi-circular shape is shallowest for concavity 12a and becomes steeper in the order of concavity 12b and concavity 12c. Moreover, the formation method of such concavities 12 will be described with the manufacturing method of the microlens array substrate described later.

The lens layer 13 is formed so as to embed the concavities 12 on the one face 11a side of the substrate 11. The lens layer 13 has optical transparency and is formed from material having a different refractive index than the substrate 11. More specifically, the lens layer 13 is formed from an inorganic material with a higher optical refractive index than the substrate 11. Examples of such an inorganic material include, for example, SiON and $Al_2O_3$.

By embedding the concavities 12 with the lens layer 13, convex-shaped microlenses ML are configured. A microlens ML1 is configured as a first microlens corresponding to the concavity 12a, a microlens ML3 is configured as a second microlens corresponding to the concavity 12c and a microlens ML2 is configured corresponding to the concavity 12b.

The microlenses ML1, ML2, and ML3 correspond to the pixels P1, P2, and P3 respectively. The microlens array MLA is configured through the plurality of microlenses ML. Moreover, below, descriptions common to the microlenses ML1, ML2, and ML3 are simply denoted by microlens ML.

The pass layer (optical path length-adjusting layer) 31 is provided so as to cover the microlens array substrate 10. The pass layer (optical path length-adjusting layer) 31, for example, is formed from an inorganic material having approximately the same refractive index as the substrate 11. The pass layer (optical path length-adjusting layer) 31 has a function of matching the focal distance of the microlens ML to a desired value, along with planarizing the surface of the microlens array substrate 10. Accordingly, the layer thickness of the pass layer (optical path length-adjusting layer) 31 is appropriately set based on the optical conditions, such as the focal distance, of the microlens ML according to the wavelength of light.

The light blocking layer 32 is formed in a lattice pattern so as to overlap the light blocking layer 22 and the light blocking layer 26 of the element substrate 20 in plan view. The light blocking layer 32 is configured by the same material as the light blocking layers 22 and 26. The region (inside opening portions 32a) surrounded by the light blocking layer 32 is a region light passes through. The protective layer 33 is provided so as to cover the pass layer (optical path length-adjusting layer) 31 and the light blocking layer 32.

The common electrode 34 is formed so as to cover the protective layer 33. The common electrode 34 is formed straddling a plurality of pixels P. The common electrode 34 is formed from a transparent conductive film, such as, for example, ITO (Indium Tin Oxide) or IZO (Indium Zinc Oxide). The alignment film 35 is provided so as to cover the common electrode 34. The liquid crystal layer 40 is sealed between the alignment film 29 on the element substrate 20 side and the alignment film 35 on the counter substrate 30 side.

Moreover, the protective layer 33 covers the light blocking layer 32 such that the surface of the common electrode 34 facing the liquid crystal layer 40 becomes flat, and is not a necessary constituent element. The common electrode 34 may be formed to directly contact and cover the conductive light blocking layer 32. The liquid crystal layer 40 is sealed between the alignment film 29 on the element substrate 20 side and the alignment film 35 on the counter substrate 30 side.

In the liquid crystal device 1 according to the first embodiment, light is incident from the counter substrate 30 (substrate 11) side including the microlens array substrate 10, and light is collected by the microlens ML. For example, among the light incident on the convex microlens ML2 from the substrate 11 side, incident light L1 incident along the optical axis passing through a planar center of the pixel P2 proceeds directly to microlens ML2 as is, and is emitted to the element substrate 20 side by passing through the liquid crystal layer 40.

Incident light L2 incident on the peripheral edge portion of the microlens ML2 from the region overlapping the light blocking layer 32 in plan view further to the outside than the incident light L1, in a case of temporarily proceeding directly as is, is blocked by the light blocking layer 32 as shown by the dashed line; however, the light refracts to the planar center side of the pixel P2 due to differences in the optical refractive index between the substrate 11 and the lens layer 13. In the liquid crystal device 1, incident light L2 blocked by the liquid blocking layer 32 in a case proceeding directly in this way is also able to pass through the liquid crystal layer 40 by being incident inside the opening portion 32a of the light blocking layer 32 due to the light collecting action of each microlens ML. As a result, since the amount of light emitted from the element substrate 20 side is able to increase, it is possible to increase the utilization efficiency of light.

As described above, since the curvature of the concavities 12 when approximating a semi-circular shape becomes smaller towards the center portion from the outer edge side in the order of concavity 12c, concavity 12b and concavity 12a, the degree of curve of the curved surface becomes shallower in the order of concavity 12c, concavity 12b and concavity 12a. Accordingly, the collection efficiency of the microlens ML becomes lower towards the center portion from the outer edge side in the direction of the line A-A' in the order of microlens ML3, microlens ML2, and microlens ML1.

Figure 4A:
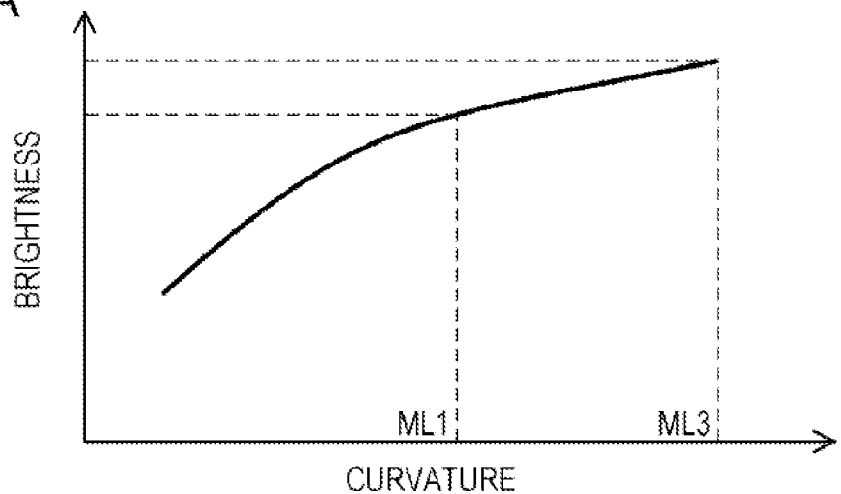
FIGS. 4A to 4C are schematic drawings describing the effects of a microlens array substrate according to the first embodiment.
Figure 4B:
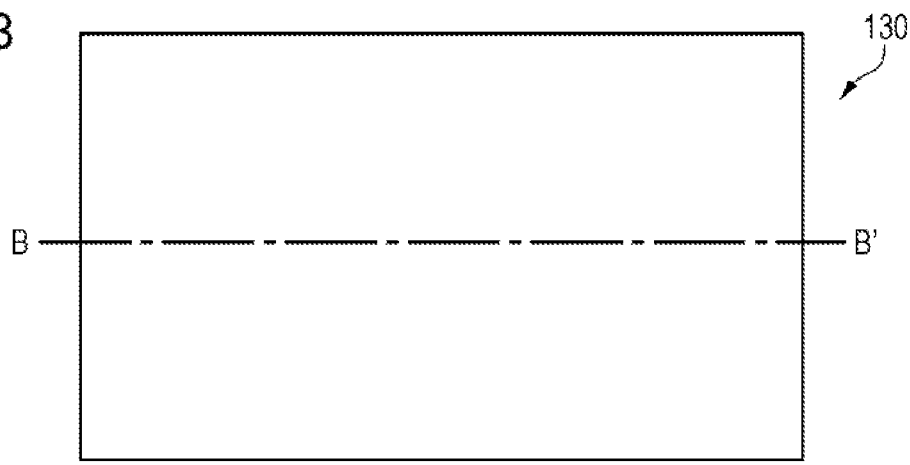
Figure 4C:
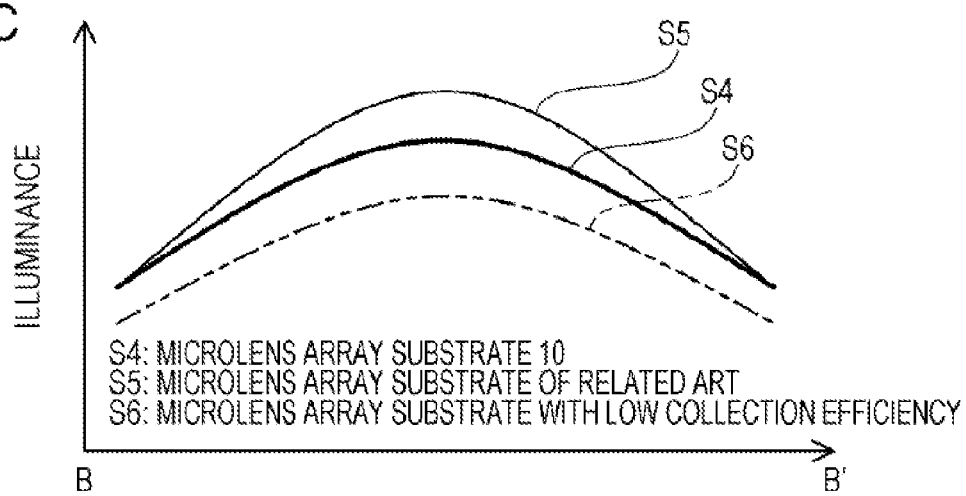

Here, the effects obtained in a case where the liquid crystal device 1 including the microlens array substrate 10 having such a configuration is used as a liquid crystal light valve of a projector 100 (refer to FIG. 10) described below will be described with reference to FIGS. 4A to 4C. FIGS. 4A to 4C are schematic drawings describing the effects of a microlens array substrate according to the first embodiment.

Figure 10:
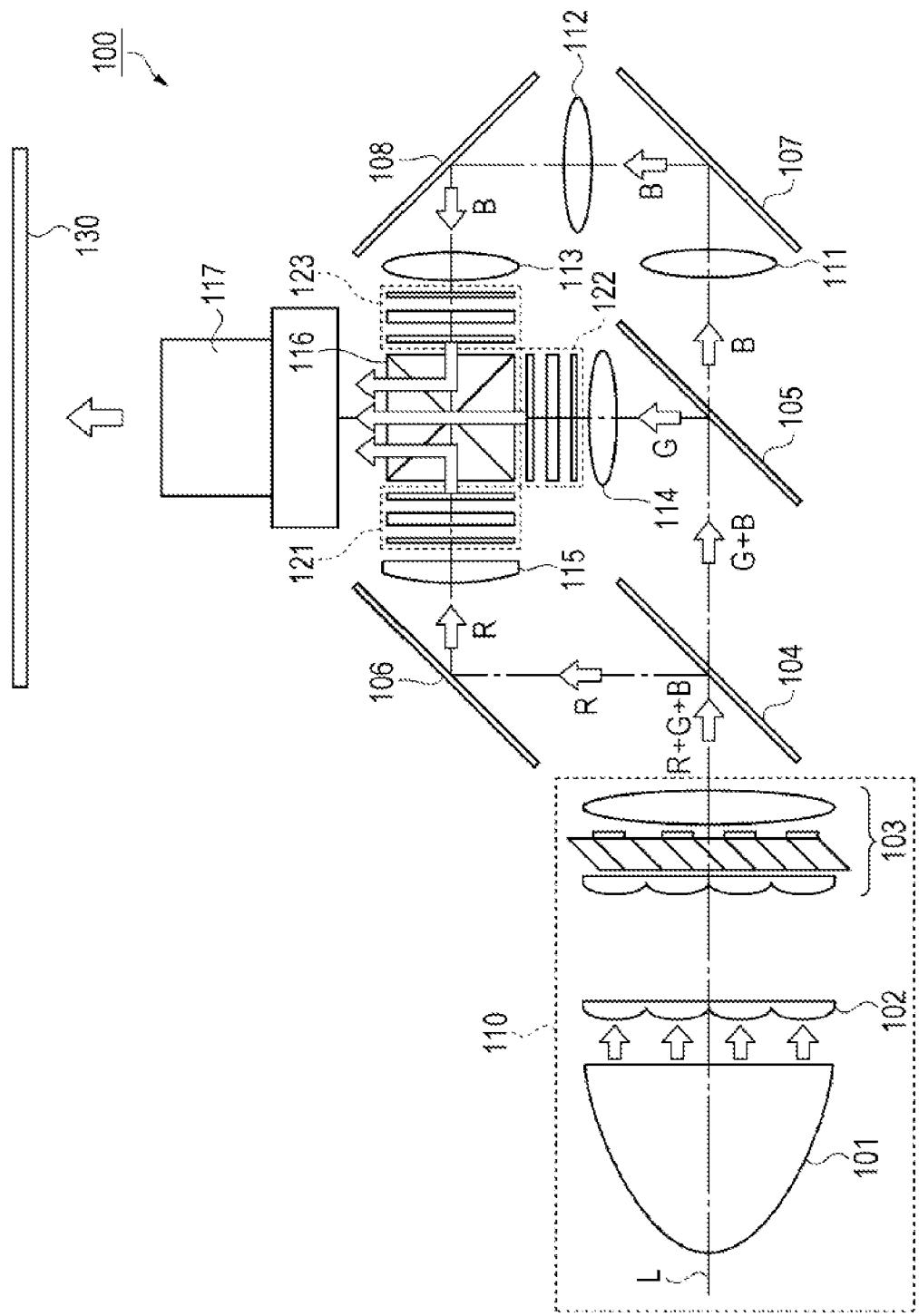
FIG. 10 is a schematic diagram showing a configuration of a projector as an electronic apparatus according to a fourth embodiment.

FIG. 4A is a drawing schematically showing the relationship between the curvature of a microlens and brightness of an image when projected on a screen 130 from a projector 100 as shown in FIG. 10. FIG. 4B is a drawing viewed from the front of a screen 130 on which an image is projected from the projector 100. FIG. 4C is a drawing schematically showing an illuminance distribution in the direction of line B-B' of the screen 130 shown in FIG. 4B. Moreover, the direction of the line B-B' of the screen 130 corresponds to the direction of the line A-A' of the liquid crystal device 1.

As shown in FIG. 4A, the microlens ML1 has a smaller curvature and lower collection efficiency than the microlens ML3. The collection efficiency of the microlens ML being small (or large) signifies that the degree to which light incident on the microlens ML is collected in the center portion of the microlens ML by being refracted is small (or large).

For example, the microlens ML3 with a large curvature and a large collection efficiency is able to collect more light in the central portion of the microlens ML3 by incident light L2 incident on the peripheral edge portion of the microlens ML3 being more greatly refracted than the microlens ML1 with a small curvature and a small collection efficiency.

Therefore, in FIG. 3, the greater the collection efficiency of the microlens ML, the greater the degree to which the amount of light emitted to the element substrate 20 side by passing though the liquid crystal layer 40 without being blocked by the light blocking layers 22, 26, and 32 blocking light to the TFT 24 increases with respect to the amount of light incident on the microlens ML. As a result, as shown in FIG. 4A, an image when projected on a screen 130 becomes brighter with the microlens ML3 with a large curvature and a large collection efficiency than with the microlens ML1 with a small curvature and a small collection efficiency.

In the microlens array substrate 10, since the collection efficiency becomes greater from the center portion towards the outer edge side in the order of the microlenses ML1, ML2, and ML3, the brightness of the pixels P becomes brighter from the center portion toward the outer edge side in the order of pixels P1, P2, and P3. In other words, in the microlens array substrate 10, the collection efficiency becomes lower from the outer edge side towards the center portion in the order of the microlenses ML3, ML2, and ML1 and the pixels P3, P2, and P1 become darker in this order.

Moreover, on the microlens array substrate 10, microlenses ML are provided corresponding to each pixel P shown in FIG. 1. The collection efficiency of each microlens ML on the microlens array substrate 10 is set so as to become sequentially greater from the microlens ML1 corresponding to the pixel P1 positioned in the center of the display region E in the liquid crystal device 1 towards the pixel P3 positioned furthest to the outer edge side in the direction of the line (X direction) A-A'. That is, in the microlens array substrate 10, the shapes of the microlenses ML (concavities 12) differ such that the curvature of each microlens ML (concavity 12) becomes continuously increases from the central portion towards the outer edge side.

In addition, the collection efficiency of each microlens ML on the microlens array substrate 10 is set so as to become continuously greater in the Y direction, in a diagonal direction intersecting the X direction and the Y direction and towards the pixel P positioned furthest towards the outer edge side in each direction from the pixel P1 positioned in the center portion. In other words, the collection efficiency of each microlens ML on the microlens array substrate 10 becomes continuously lower from the outer edge side towards the center portion in the X direction, Y direction and a diagonal direction of each direction.

In FIG. 4B, the direction of the line B-B' passing through the center portion in the perpendicular direction (vertical direction in FIG. 4B) of the screen 130 and along the horizontal direction (left and right direction in FIG. 4B) of the screen 130 corresponds to the direction of the line A-A' in the liquid crystal device 1 (refer to FIG. 1).

In FIG. 4C, S4 is an illuminance distribution in a case of projecting with a projector 100 using the liquid crystal device 1 as a liquid crystal light valve including the microlens array substrate 10 according to the first embodiment. S5 is an illuminance distribution in a case of projecting with a projector in which a liquid crystal device including a microlens array substrate of the related art is used as a liquid crystal light valve. The microlens array substrate of the related art as stated here, for example, indicates that the collection efficiency of each microlens ML is uniform and the same as the collection efficiency of the microlens ML3 of the microlens array substrate 10.

In the microlens array substrate of the related art shown in S5, the illuminance is greatest at the center portion in the direction of the line B-B', and the illuminance becomes gradually lower from the center portion towards the outer edge sides of the screen 130 (both the left and right sides). That is, even if the collection efficiency of the microlenses ML is uniform, the illuminance of an image projected on the screen 130 does not become uniform and becomes gradually darker from the center portion towards the outer edge sides. Although not shown in the drawings, a similar tendency to become gradually darker from the center portion towards the outer edge sides is seen also in the perpendicular direction of the screen 130, although not to the extent of the horizontal direction.

A case is considered in which the angle of incidence of light incident on the projection lens is different between the center portion and the outer edge sides and differences in vignetting in the projection lens occur because the angle of incidence of light incident on the liquid crystal light valve is different between the center portion and the outer edge sides as a cause.

In addition, a case is considered in which differences in illuminance occur through position dependence of engulfing of the light on the projection lens passing through the liquid crystal light valve, even if the angle of incidence of light incident on the liquid crystal light valve is uniform between the center portion and the outer edge sides. As a result, in a liquid crystal light valve including the microlens array substrate of the related art, unevenness occurs in the illuminance by an image projected on the screen 130 becoming lighter in the center portion and darker at the outer edge sides, and there is a problem in that the image quality lowers.

In addition, S6 is an illuminance distribution in a case of a microlens array substrate ML1 with the smallest collection efficiency in the microlens array substrate 10 being applied to each microlens ML, as the microlens array substrate of the related art. As shown in S6, when the collection efficiency of all of the microlenses ML becomes small, the illuminance becomes lower overall from the central portion to the outer edge side portions, and an image projected on the screen 130 becomes darker overall, compared to a case shown in S5.

In contrast, in the microlens array substrate 10 according to the first embodiment shown in S4, because the collection efficiency of the microlenses ML become lower from the outer edge sides towards the center portion, the brightness of the pixel P1 at the center portion is suppressed compared to the pixel P3 at the outer edge side. Accordingly, the illuminance due to the microlens array substrate 10 according to the first embodiment shown in S4 is the same at the outer edge sides but lower at the center portion compared to the microlens array substrate in the related art shown in S5. In so doing, it is possible to suppress unevenness in the illuminance between the outer edge sides and the center portion.

In the microlens array substrate 10 according to the first embodiment, the illuminance at the center portion is lower than the microlens array substrate of the related art not only in the X direction, but also in the Y direction and the diagonal direction intersecting the X direction and the Y direction. Accordingly, a more uniform illuminance distribution without the illuminance of the outer edge sides being lowers is obtained in the microlens array substrate 10 according to the first embodiment, compared to the microlens array substrate of the related art. As a result, since unevenness in the illuminance between the center portion and the outer edge sides is eased, it is possible for the quality of an image projected on the screen 130 to be improved.

Moreover, since the collection efficiency of each microlens ML becomes continuously lower from the outer side edges towards the center portion, it possible to make the difference in illuminance causing a difference in collection efficiency between adjacent microlenses ML difficult to discern in an image projected on the screen 130.

However, as described above, the degree to which light is collected at the center portion of the microlens ML by light incidence on the microlens ML being refracted becomes smaller as the collection efficiency of the microlens ML becomes lower. Accordingly, the inclination of the optical axis of light in which the incident light is refracted by the microlens ML with respect to the normal direction of the surface 11b (refer to FIG. 3) of the substrate 11 becomes smaller from the outer edge sides towards the center portion in the order of microlenses ML3, ML2, and ML1.

Since the liquid crystal molecules are arranged evenly in substantially the same direction in the liquid crystal layer 40, the contrast improves as the deviation of the optical axis of light passing through the liquid crystal layer 40 becomes smaller. In the microlens array substrate 10, since the degree of inclination of the optical axis of refracted light becomes smaller from the outer edge sides towards the center portion in the order of microlenses ML3, ML2, and ML1, the contrast in the liquid crystal device 1 improves from the outer edge sides towards the center portion. As a result, in an image projected on the screen 130, it is possible to improve the contrast in the center portion.

Moreover, in the liquid crystal device 1 according to the first embodiment, a configuration in which the counter substrate 30 includes the microlens array substrate 10 is assumed has been described, however, the configuration may be one in which the element substrate 20 includes the microlens array substrate 10.

Manufacturing Method of Microlens Array Substrate

Next, a manufacturing method of the microlens array substrate 10 according to the first embodiment will be described with reference to FIGS. 5, 6, and 7. FIGS. 5, 6, and 7 are a schematic cross-sectional views showing a manufacturing method of a microlens array substrate according to the first embodiment. More specifically, each drawing of FIGS. 5, 6, and 7 is taken along the line A-A' in FIG. 1. Moreover, below, the direction along line A-A' (X direction) is referred to as the width direction.

Moreover, although not shown, in the manufacturing steps of the microlens array substrate 10, a large-sized substrate (mother substrate) from which a plurality of microlens array substrates 10 may be taken is works, and, by separating the mother substrate into individual pieces, a plurality of microlens array substrates 10 is finally obtained. Accordingly, in each step described below, work is performed in a state of the mother substrate before division into individual pieces, here working with respect to individual microlens array substrates 10 in the mother substrate will be described.

Figure 5A:
FIGS. 5A to 5D are schematic cross-sectional views showing a manufacturing method of a microlens array substrate according to the first embodiment.

First, as shown in FIG. 5A, a control film 71 is formed on one face 11a of the substrate 11 having optical transparency formed from quartz or the like. The control film 71, for example, is formed from an oxide film such as $SiO_2$. The control film 71 is for controlling the degree of etching in the width direction (X direction) such that a desired shape as the sharp of the concavities 12a, 12b, and 12c formed on the substrate 11 is obtained.

The control film 71 is formed so as to further increase the etching rate of the substrate 11 in isotropic etching. First, annealing is performed at a predetermined temperature after an oxide film that becomes the control film 71 is formed on the one face 11a of the substrate 11. The etching rate of the control film 71 is changes according to the temperature during annealing. Accordingly, it is possible to adjust the etching rate of the control film 71 by appropriately setting the temperature during annealing.

Figure 5B:
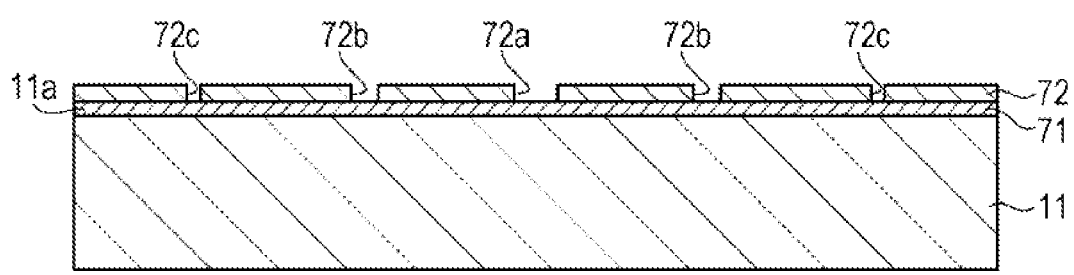

Next, as shown in FIG. 5B, a mask layer 72 is formed by being laminated on the control film 71. Then, the mask layer 72 is patterned, and opening portions 72a, 72b, and 72c are formed in the mask layer 72. Here, the opening portions 72a, 72b, and 72c are provided opposing the positions at which the concavities 12a, 12b, and 12c (microlenses ML1, ML2, and ML3) are formed. The planar shape of the opening portions 72a, 72b, and 72c is, for example, a circular shape.

The opening portion 72a is provided at the center portion in the direction along the line A-A', the opening portion 72c is provided furthest to the outer edge side, and the opening portion 72b is provided between the opening portion 72a and the opening portion 72c. For the opening diameter of the opening portions 72a, 72b, and 72c, the opening portion 72a is the largest, and the diameters become smaller in the order of opening portions 72b and 72c.

Figure 5C:
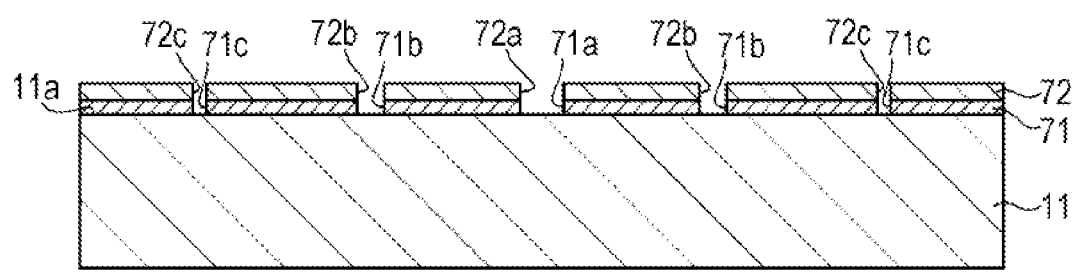

Next, as shown in FIG. 5C, the control film 71 is subjected to dry etching via the mask layer 72. In so doing, opening portions 71a, 71b, 71c are formed in the control film 71 corresponding to the opening portions 72a, 72b, and 72c. Then, one face 11a of the substrate 11 is exposed in the opening portions 71a, 71b, and 71c. The opening diameter of the opening portions 71a, 71b, and 71c is the same as the opening diameter of the respective opening portions 72a, 72b, and 72c.

Figure 5D:
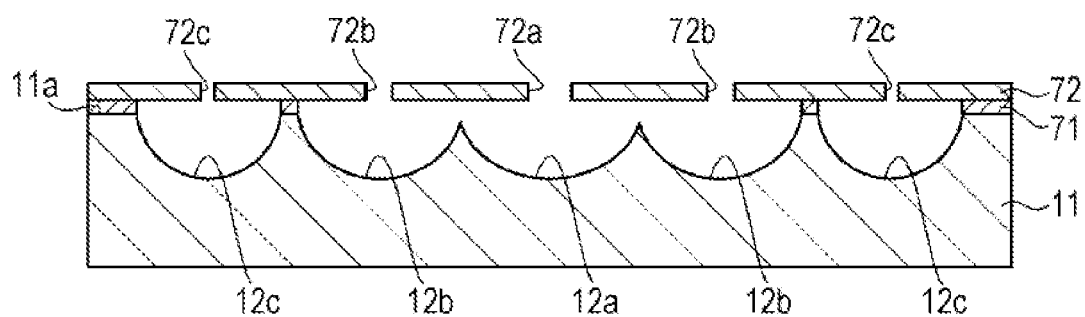

Next, as shown in FIG. 5D, the concavities 12a, 12b, and 12c are formed in the substrate 11 performing isotropic etching via the opening portions 72a, 72b, and 72c of the mask layer 72. Wet etching using an etching liquid, for example, a hydrofluoric acid solution or the like, such that the etching rate of the control film 71 becomes greater than the etching rate of the substrate 11 is used as the isotropic etching process. Through the etching process, the substrate 11 is etched from the one face 11a side with the opening portions 72a, 72b, and 72c as a center, along with etching the control film 71 with the opening portions 72a, 72b, and 72c as a center. In so doing, the concavities 12a, 12b, and 12c are formed on the substrate 11 in concentric circles with the opening portions 72a, 72b, and 72c as a center in plan view.

Figure 6A:
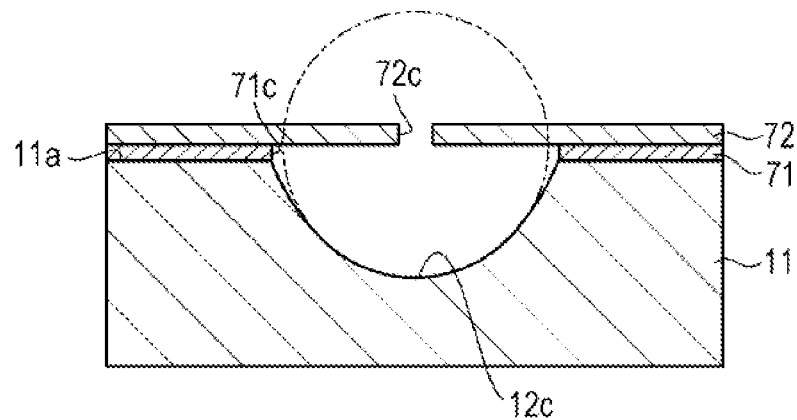
FIGS. 6A and 6B are schematic cross-sectional views showing a manufacturing method of a microlens array substrate according to the first embodiment.
Figure 6B:
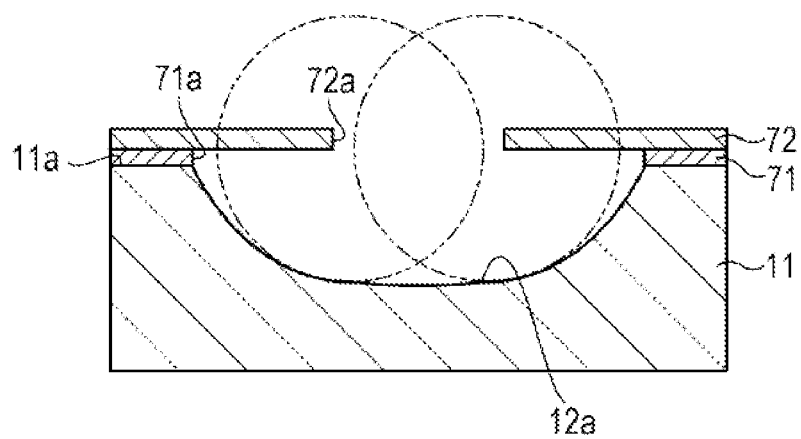

The shape of the concavity 12c formed via the opening portion 72c is shown in FIG. 6A, and the shape of the concavity 12a formed via the opening portion 72a is shown in FIG. 6B. As shown in FIGS. 6A and 6B, the concavity 12c is formed in the substrate 11 with the opening 72c as a center, and the concavity 12a is formed in the substrate 11 with the opening portion 72a as a center. The shape of the concavities 12a, 12b, and 12c formed by isotropic etching is shown by a two-dot chain line in FIGS. 6A and 6B, in a case in which the control film 71 is not provided.

As shown in FIG. 6A by the two-dot chain line, in a case in which the control film 71 is not provided, the shape of the concavity 12c ideally becomes a hemispherical shape (a semicircular shape in cross-sectional view). Here, in the present embodiment, the control film 71 with a greater etching rate in isotropic etching than the substrate 11 is provided in the space between the one face 11a of the substrate 11 and the mask layer 72. Therefore, the etching amount per unit time of the control film 71 becomes greater than the etching amount per unit time of the substrate 11.

Accordingly, the expansion amount of the opening portion 71c of the control film 71 etched via the opening portion 72c of the mask layer 72 is becomes greater than the expansion amount in the depth direction of the concavity 12c. Therefore, the width direction (X direction) of the concavity 12c also expands accompanying expansion of the opening portion 71c, and the opening portion of the concavity 12c becomes larger than the opening portion of the concavity 12c formed in a case in which the control film 71 shown by the two-dot chain line is not provided.

As shown in FIG. 6B, since the opening diameter of the opening portion 72a of the mask layer 72 is greater than that of the opening portion 72c, even in a case in which the control film 71 shown by the two-dot chain line is not provided, the etching amount in the width direction (X direction) is further increased compared to the case shown in FIG. 6A. Accordingly, the opening portion of the concavity 12a is larger than the opening portion of the concavity 12c.

Furthermore, because the opening diameter of the opening portion 72a of the mask layer 72 is large, since the control film 71 is further etched compared to the case shown in FIG. 6A, the amount of increase in the opening portion of the concavity 12a with respect to a case in which the control film 71 is not provided is increased. As a result, the radius of curvature when the shape of the concavity 12a approximates a semi-circular shape becomes greater than the radius of curvature when the shape of the concavity 12c approximates a semi-circular shape.

Moreover, although not shown in the drawings, the opening diameter of the concavity 12b formed via the opening portion 72b of the mask layer 72 is smaller than the opening diameter of the concavity 12b, and larger than the opening diameter of the concavity 12c. Accordingly, the radius of curvature when the shape of the concavity 12b approximates a semi-circular shape becomes smaller than the radius of curvature when the shape of the concavity 12a approximates a semi-circular shape, and becomes greater than the radius of curvature when the shape of the concavity 12c approximates a semi-circular shape.

In addition, although the control film 71 is shown on both sides of the opening portion of the concavity 12a in FIG. 6B, if etching is performed until the concavity 12a and the adjacent concavity 12b contact one another, the control film 71 is removed between the concavity 12a and the concavity 12b.

As described above, since it is possible to adjust the etching rate of the control film 71 by setting the temperature during annealing, it is possible to adjust the radius of curvature of the concavities 12a, 12b, and 12c formed by appropriately setting the opening diameter of the opening portions 72a, 72b, and 72c of the mask layer 72 and the etching rate of the control film 71.

Figure 7A:
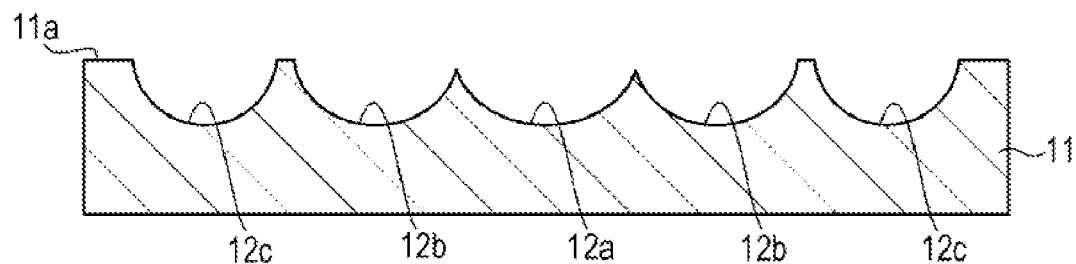
FIGS. 7A to 7C are schematic cross-sectional views showing a manufacturing method of a microlens array substrate according to the first embodiment.
Figure 7B:
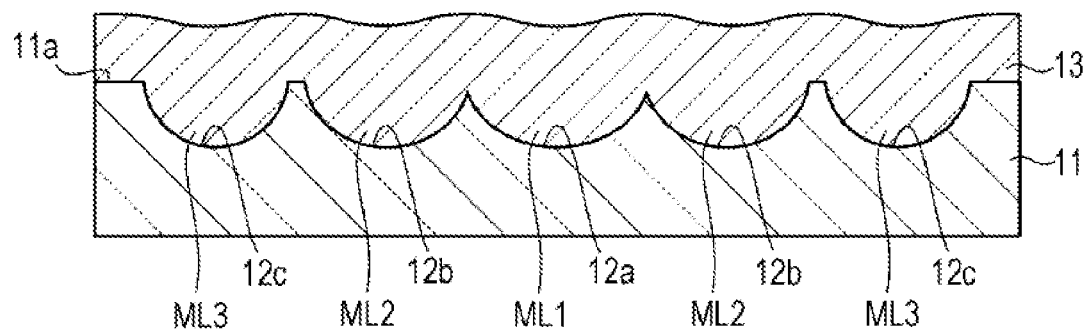

Next, as shown in FIG. 7A, the control film 71 and the mask layer 72 are removed from the one face 11a side of the substrate 11. Subsequently, as shown in FIG. 7B, the lens layer 13 formed from an inorganic material having optical transparency and having a higher refractive index than the substrate 11 is formed so as to embed the concavities 12a, 12b, and 12c formed on the substrate 11.

The lens layer 13 may be formed using, for example, a Chemical Vapor Deposition (CVD) method. In so doing, the microlenses ML1, ML2, and ML3 are configured corresponding to the concavities 12a, 12b, and 12c. A step difference is reflected by the concavities 12a, 12b, and 12c in the surface of the lens layer 13.

Figure 7C:
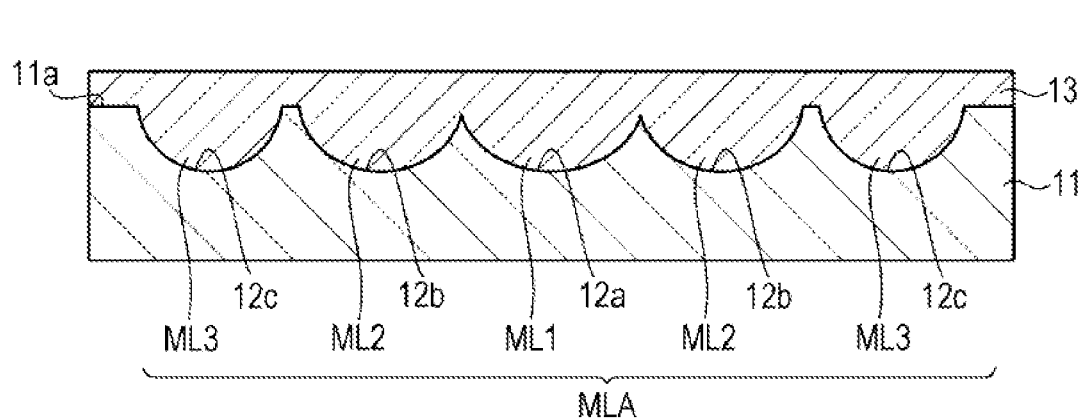

Next, as shown in FIG. 7C, for example, a planarizing process is performed on the surface of the lens layer 13 using a chemical mechanical polishing (CMP) process or the like. The remaining thickness of the lens layer 13 after the planarization process, that is, the layer thickness of the lens layer 13 is appropriately set based on the optical conditions, such as the focal distance, of the microlens ML formed. In so doing, the microlens array substrate 10 including the microlens array MLA is completed.

Second Embodiment

Liquid Crystal Device

The liquid crystal device according to the second embodiment differs with respect to the liquid crystal device according to the first embodiment on the point of including a microlens array substrate on both of the element substrate and the counter substrate; however, the other configurations are substantially the same. Here, constituent elements in common with the first embodiment are given the same reference numerals and will not be described.

Figure 8:
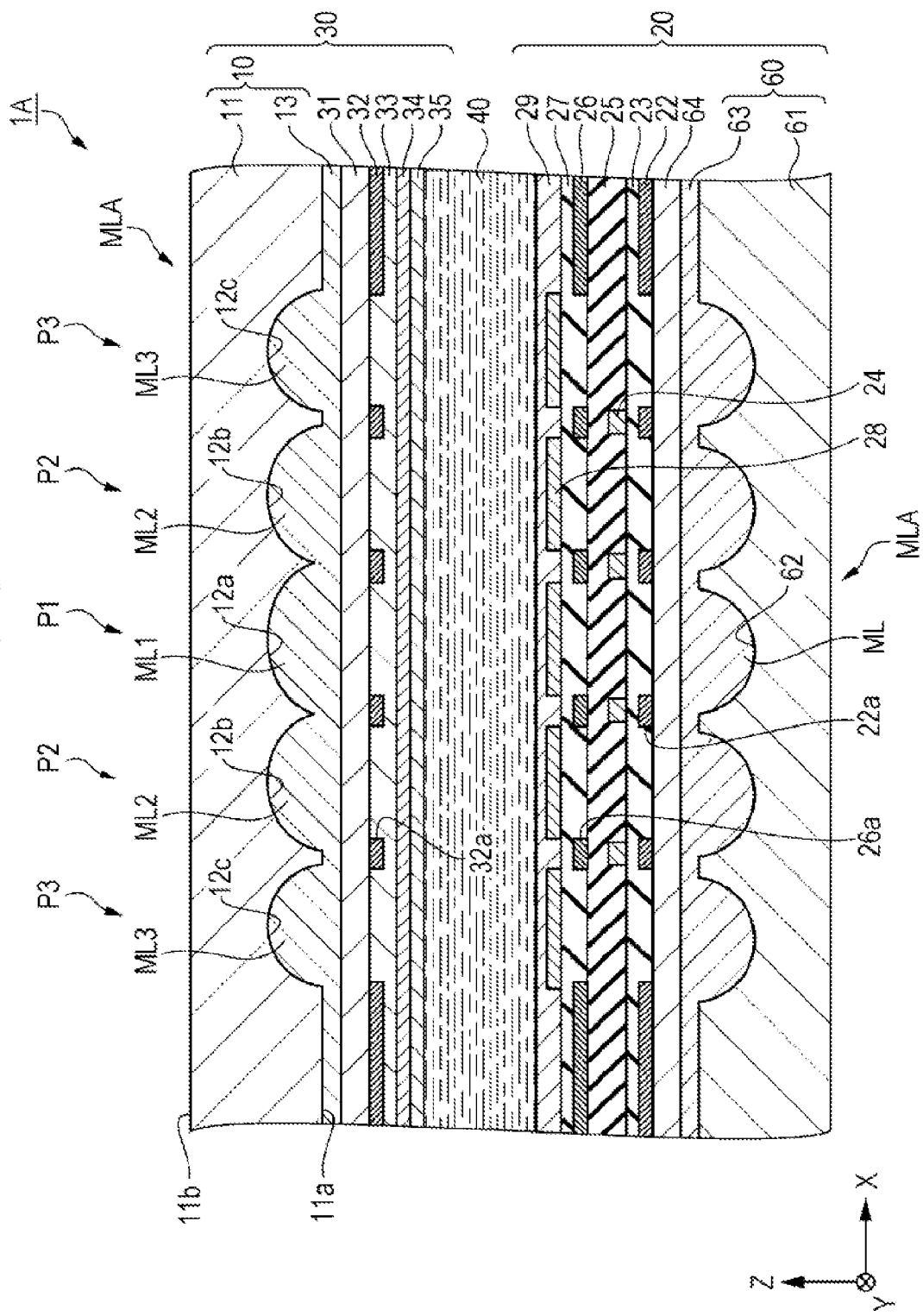
FIG. 8 is a schematic cross-sectional view showing a configuration of a liquid crystal device according to a second embodiment.

A configuration of a liquid crystal device according to a second embodiment will be described. FIG. 8 is a schematic plan view showing a configuration of a liquid crystal device according to the second embodiment. More specifically, FIG. 8 is a schematic cross-sectional view taken along line A-A' (X direction) in FIG. 1.

As shown in FIG. 8, the liquid crystal device 1A according to the second embodiment includes and microlens array substrate 10 on the counter substrate 30 similarly to the liquid crystal device 1 according to the first embodiment and also includes a further microlens array substrate 60 on the element substrate 20.

The element substrate 20 includes a microlens array substrate 60, a pass layer (optical path length-adjusting layer) 64, a light blocking layer 22, an insulating layer 23, a TFT 24, an insulating layer 25, a light blocking layer 26, an insulating layer 27, a pixel electrode 28 and an alignment film 29. The pass layer (optical path length-adjusting layer) 64 has the same configuration as the pass layer (optical path length-adjusting layer) 31 on the counter substrate 30 side.

The microlens array substrate 60 includes a substrate 61 and a lens layer 63. The substrate 61 is configured by the same material as the substrate 11, and the lens layer 63 is configured by the same material as the lens layer 13. A concavity 62 with the same shape with respect to any of the pixels P1, P2, and P3 is provided on the substrate 61. That is, the microlens ML of the microlens array substrate 60 has the same curvature and same collection efficiency as any of the pixels P1, P2, and P3.

The counter substrate 30 is configured including a microlens array substrate 10, a pass layer (optical path length-adjusting layer) 31, a light blocking layer 32, a protective layer 33, a common electrode 34, and an alignment film 35, similarly to the liquid crystal device 1 according to the first embodiment.

Since the liquid crystal device 1A according to the second embodiment includes the microlens array substrate 10 on the counter substrate 30, unevenness in the illuminance between the center portion and the outer edge sides is eased, and it is possible for the quality of an image projected on the screen 130 to be improved.

Furthermore, since the microlens array substrate 60 is also included on the element substrate 20 in the liquid crystal device 1A according to the second embodiment, light incident from the counter substrate 30 and refracted by the microlens ML of the microlens array substrate 10 is refracted again by the microlens ML of the microlens array substrate 60. In so doing, it is possible to emit light to the projection lens 117 (refer to FIG. 10) side by aligning the optical axis of light collected by the microlens ML of the microlens array substrate 10 with the microlens ML of the microlens array substrate 60.

Moreover, in the liquid crystal device 1A according to the second embodiment, a configuration in which the counter substrate 30 includes the microlens array substrate 10 is assumed has been described; however, the configuration may be one in which the element substrate 20 includes the microlens array substrate 10, and the counter substrate 30 includes the microlens array substrate 60.

According to such a configuration, the light incident from the counter substrate 30 side is uniformly collected at the center portion of the microlens ML through each microlens from the center portion to the outer edge sides. Accordingly if the microlens array substrate 60 includes the microlens ML with a high collection efficiency, since the incident light is collected at the center portion of the microlens ML in any of the pixels P1, P2, and P3, the amount of light absorbed by the light blocking layers 22, 26, and 32 is small. In so doing, it is possible to suppress heat emitted by the light blocking layers 22, 26, and 32 absorbing light.

In addition, in the liquid crystal device 1A according to the second embodiment, the configuration may include a microlens array substrate 10 on both of the element substrate 20 and the counter substrate 30.

Third Embodiment

Liquid Crystal Device

The liquid crystal device according to the third embodiment differs with respect to the liquid crystal device according to the first embodiment on the point of including two microlens array substrates the counter substrate; however, the other configurations are substantially the same. Here, constituent elements in common with the first embodiment are given the same reference numerals and will not be described.

Figure 9:
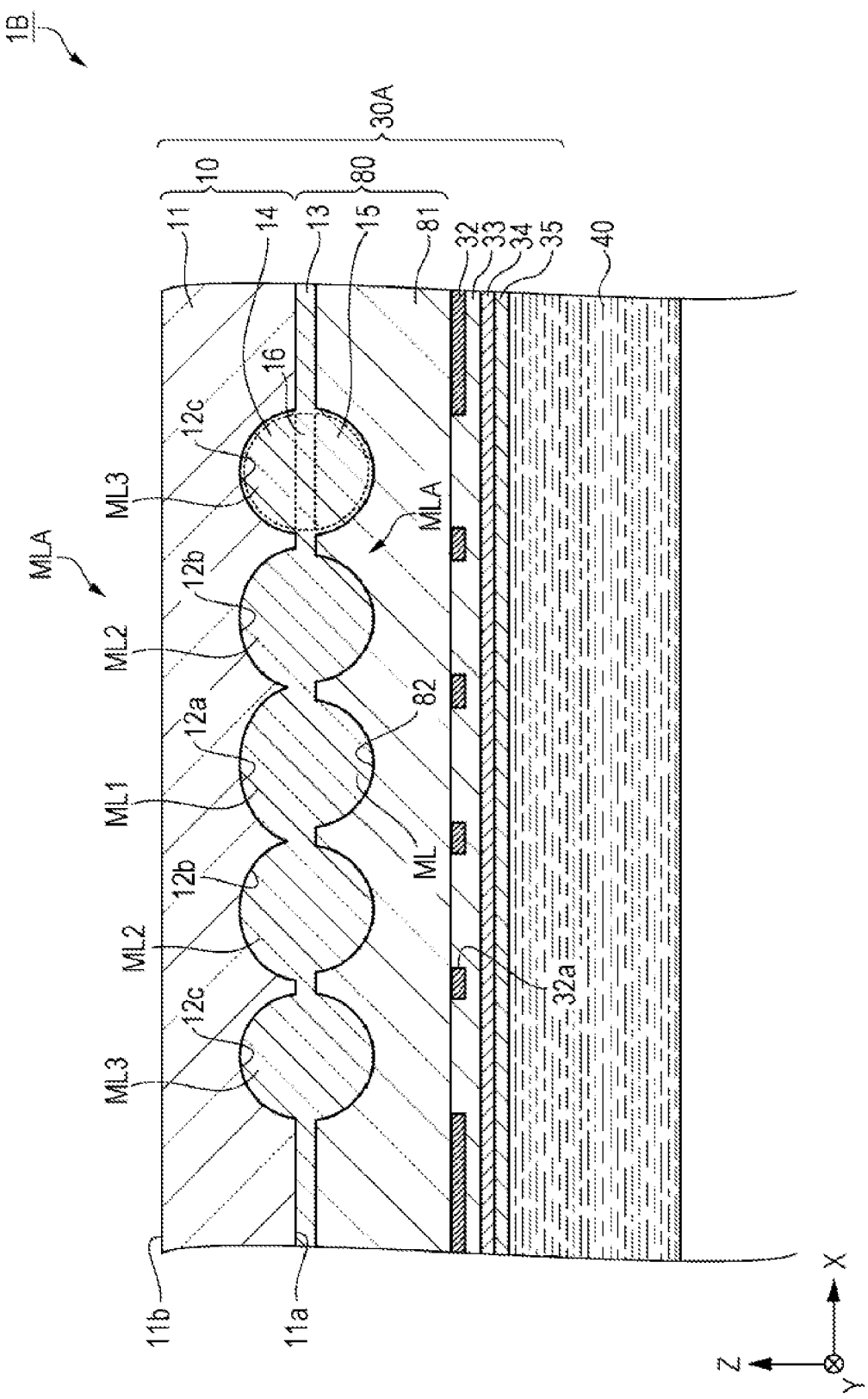
FIG. 9 is a schematic cross-sectional view showing a configuration of a liquid crystal device according to a third embodiment.

In the liquid crystal device according to the third embodiment, with respect to the liquid crystal device according to the first embodiment, two microlens array substrates are included on the counter substrate, and the configuration of counter substrates is different. Here, the configuration of the counter substrates according to the third embodiment will be principally described. FIG. 9 is a schematic plan view showing a configuration of a liquid crystal device according to the third embodiment. FIG. 9 corresponds to a schematic cross-sectional view taken along line A-A' (X direction) in FIG. 1; however, the element substrate is not shown in the drawing.

As shown in FIG. 9, the liquid crystal device 1B according to the third embodiment includes a counter substrate 30A. The counter substrate 30A includes a microlens array substrate 10 according to the first embodiment, a microlens array substrate 80, a light blocking layer 32, a protective layer 33, a common electrode 34, and an alignment film 35.

The microlens array substrate 80 includes a substrate 81 and a lens layer 13. The substrate 81 is configured by the same material as the substrate 11. A concavity 82 with the same shape with respect to any of the pixels P1, P2, and P3 is provided on the substrate 81. Accordingly, the microlens ML of the microlens array substrate 80 has the same collection efficiency as any of the pixels P1, P2, and P3.

The lens layer 13 is interposed between the substrate 11 and the substrate 81, and is provided so as to embed the concavity 82 provided in the substrate 81. In the counter substrate 30A, the lens layer 13 has a part 14 embedded in the concavity 12 of the substrate 11, a part 15 embedded in the concavity 82 of the substrate 81, and a part 16 interposed between the part 14 and the part 15.

Among the lens layer 13, the part 14 functions as a microlens ML of the microlens array substrate 10, and the part 15 functions as the microlens array ML of the microlens array substrate 80. Then, the part 16 has a function of adjusting the optical path length between two opposing microlens arrays ML.

In the liquid crystal device 1B, light incident from the surface 11b side of the counter substrate 30 (substrate 11) and refracted by the microlens ML of the microlens array substrate 10 is again refracted by the microlens ML of the microlens array substrate 80. In so doing, it is possible for light to be incident on the liquid crystal layer 40 by aligning the optical axis of light collected by the microlens ML of the microlens array substrate 10 with the microlens ML of the microlens array substrate 80.

In addition, although the liquid crystal device 1B according to the third embodiment is the same with respect to the liquid crystal device 1A according to the second embodiment on the point of including two microlens array substrates including the microlens array substrate 10 according to the first embodiment, the liquid crystal device 1B differs on the point of not including a microlens array substrate on the element substrate 20.

In the case of a configuration including the microlens array substrate 60 on the element substrate 20, as in the liquid crystal device 1A according to the second embodiment, in the manufacturing steps of the liquid crystal device, the TFT 24, wirings, and the like are formed on the microlens array substrate 60, and in the forming steps thereof, the microlens array substrate 60 is exposed to high temperatures and temperature changes. Therefore, there are cases of stress applied to the lens layer 63 and cracks occurring caused by differences in the thermal expansion coefficient of the substrate 61 and the lens layer 63, changes in the constitution of the lens layer 63 or the like.

In contrast, since the microlens array substrate is not provided on the element substrate 20 in the liquid crystal device 1B according to the third embodiment, in the manufacturing steps of the liquid crystal device, it is possible to avoid the risk of cracks occurring in the lens layer in the steps of forming the TFT 24, the wirings or the like.

Moreover, in the liquid crystal device 1B according to the third embodiment, the configuration includes the microlens array substrate 10 and the microlens array substrate 80 in order from the light incident side in the counter substrate 30; however, the configuration may have the microlens array substrate 10 and the microlens array substrate 80 in the opposite positional relationship to the above. In addition, the configuration may include another microlens array substrate 10 instead of the microlens array substrate 80.

Fourth Embodiment

Electronic Apparatus

Next, an electronic apparatus according to a fourth embodiment will be described with reference to FIG. 10. FIG. 10 is a schematic diagram showing a configuration of a projector as an electronic apparatus according to the fourth embodiment.

As shown in FIG. 10, the projection (projection-type display device) 100 as the electronic apparatus according to the fourth embodiment includes a polarized illumination device 110, two dichroic mirrors 104 and 105 as light separation elements, three reflection mirrors 106, 107, and 108, 5 relay lenses 111, 112, 113, 114, and 115, three liquid crystal light valves 121, 122, and 123, a cross dichroic prism 116 as a light synthesizing element, and a projection lens 117.

The polarized illumination device 110, for example, includes a lamp unit 101 as a light source formed from a white light source, such as an ultrahigh pressure mercury lamp or a halogen lamp, an integrator lens 102, and a polarization conversion element 103. The lamp unit 101, the integrator lens 102, and the polarization conversion element 103 are arranged along the system optical axis L.

The dichroic mirror 104 causes red light (R) to reflect, and allows green light (G) and blue light (B) to pass through from the polarized luminous fluxes emitted from the polarized illumination device 110. Another dichroic mirror 105 causes green light (G) passing through the dichroic mirror 104 to reflect and allows blue light (B) to pass through.

The red light (R) reflected by the dichroic mirror 104 is incident on the liquid crystal light valve 121 through the relay lens 115 after being reflected by the reflection mirror 106. The green light (G) reflected by the dichroic mirror 105 is incident on the liquid crystal light valve 122 through the relay lens 114. The blue light (B) passing through the dichroic mirror 105 is incident on the liquid crystal valve 123 through a light guiding system configured by three relay lenses 111, 112, and 113 and two reflection mirrors 107 and 108.

The transmissive-type liquid crystal light valves 121, 122, and 123 as light modulating elements are arranged opposite one another with respect to the incident face for each color of light of the cross dichroic prism 116. The colored light incident on the liquid crystal light valves 121, 122, and 123 is modulated based on video information (video signal) and emitted towards the cross dichroic prism 116.

The cross dichroic prism 116 is formed by bonding four right-angle prisms, and a cross-shape is formed by a dielectric multilayer reflecting red light and a dielectric multilayer reflecting blue light on the inner surface thereof. Three colors of light are synthesized by these dielectric multilayer films, and light representing a color image is synthesized. The synthesized light is projected on a screen 130 by a projection lens 117 that is a projection optical system, and the image is displayed by being enlarged.

The liquid crystal light valve 121 is applied to the liquid crystal devices 1, 1A, and 1B having the microlens array substrate 10 of each embodiment described above. The liquid crystal light valve 121 is arranged by being placed in the gap between a pair of polarization elements arranged in a cross Nicol arrangement in the colored light of the incident side and the emission side. The same applies to other liquid crystal light valves 122 and 123.

According to the configuration of the projector 100 according to the fourth embodiment, even if a plurality of pixels P are arranged with high precision, since the liquid crystal devices 1, 1A, and 1B having a microlens array substrate 10 in which a more uniform illuminance distribution is obtained from the center of an image projected on the screen 130 to the outer edge sides is included, it is possible to provide a bright projector 100 with high quality.

The above-described embodiments thoroughly show one form of the invention, and arbitrary modifications and applications are possible within the scope of the invention. As a modification example, for example, the following may be considered.

Modification Example 1

Figure 11A:
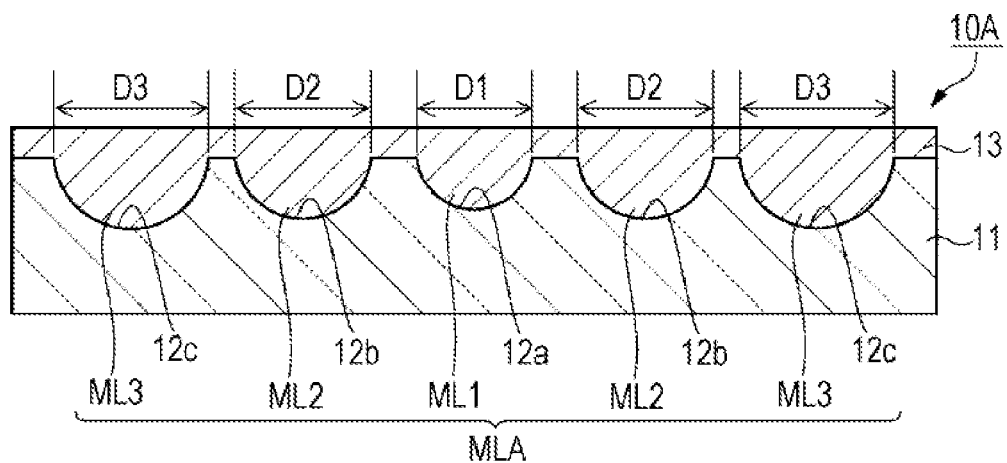
FIGS. 11A and 11B are schematic cross-sectional views showing a configuration of a microlens array substrate according to a modification example.
Figure 11B:
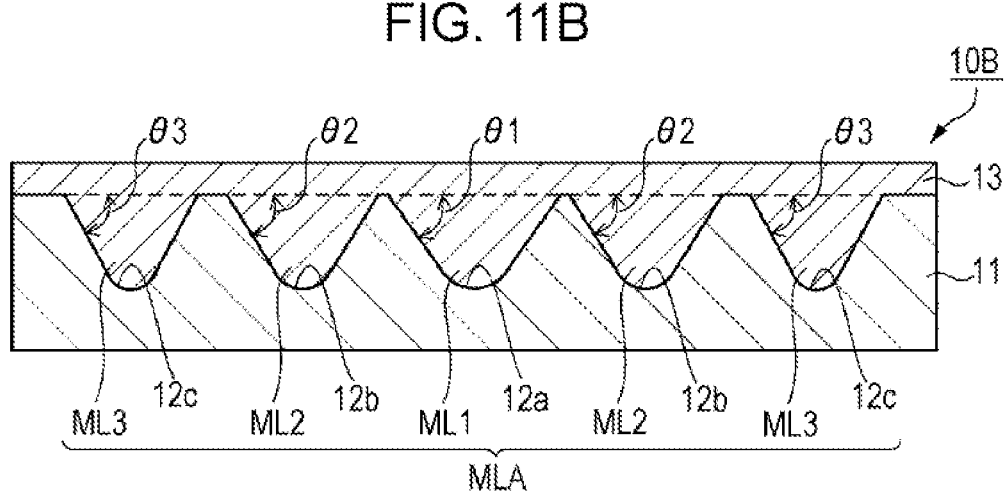

The microlens array substrate 10 according to the above embodiments has a configuration in which the collection efficiency of the microlenses ML1, ML2, and ML 3 are different by the curvature of the concavities 12a, 12b, and 12c of the lens layer 13 being different; however, the present invention is not limited to this form. FIGS. 11A and 11B are schematic cross-sectional views showing a configuration of a microlens array substrate according to a modification example. The configuration may have different collection efficiency for the microlenses ML1, ML2, and ML3 by the diameters of the microlenses ML (opening diameters of the concavities 12) being different, as in the microlens array substrate 10A according to the modification example 1 shown in FIG. 11A.

As shown in FIG. 11A, in the microlens array substrate 10A according to modification example 1, the concavities 12a, 12b, and 12c has similar shapes to one another by being formed in a substantially spherical plane shape (substantially hemispherical shape). When the diameter of the microlens ML1 is D1, the diameter of the microlens ML2 is D2, and the microlens ML3 is D3, diameter D1<diameter D2<diameter D3 is satisfied.

Accordingly, the effective surface with which the microlens ML is able to collect light with respect to incident light incident on the same surface on the microlens array substrate 10A becomes smaller from the outer edge sides towards the center portion in the order of microlenses ML3, ML2, and ML1. Accordingly, the collection efficiency of the microlenses ML becomes lower from the outer edge sides towards the center portion in the order of microlenses ML3, ML2, and ML1.

Modification Example 2

In addition, the configuration may have a different collection efficiency for the microlenses ML1, ML2 and ML3 by the inclination angle of the peripheral edge portion of the microlenses ML with respect to one face 11a of the substrate 11 being different, such as in the microlens array substrate 10B according to the modification example 2 shown in FIG. 11B.

The concavities 12a, 12b, and 12c are formed in a substantially V-shape in cross-sectional view in the microlens array substrate 10B according to the modification example 2, as shown in FIG. 11B. When the inclination angle of the peripheral edge portion of the microlens ML1 (concavity 12a) with respect to one face 11a of the substrate 11 is θ1, the inclination angle of the peripheral edge portion of the microlens ML2 (concavity 12b) is θ2, and the inclination angle of the peripheral edge portion of the microlens ML3 (concavity 12c) is θ3, θ1<θ2<θ3 is satisfied.

Light refracted by the peripheral edge portion of the microlens ML is collected at a position closer to the center portion of the microlens ML as the inclination angle θ of the peripheral edge portion increases, and is collected at positions further from the central portion of the microlens ML as the inclination angle θ of the peripheral edge portion decreases. Accordingly, the collection efficiency with respect to incident light incident from the same direction becomes lower from the outer edge sides towards the central portion in the order of the microlenses ML3, ML2 and ML1.

Modification Example 3

Figure 12A:
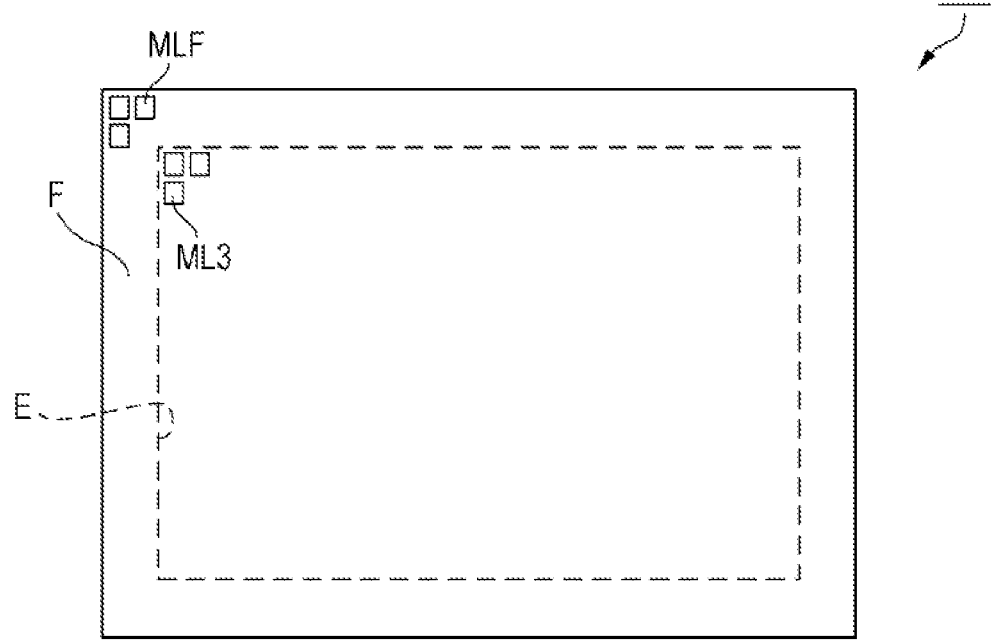
FIGS. 12A and 12B are schematic crossplan views showing a configuration of a microlens array substrate according to a modification example.
Figure 12B:
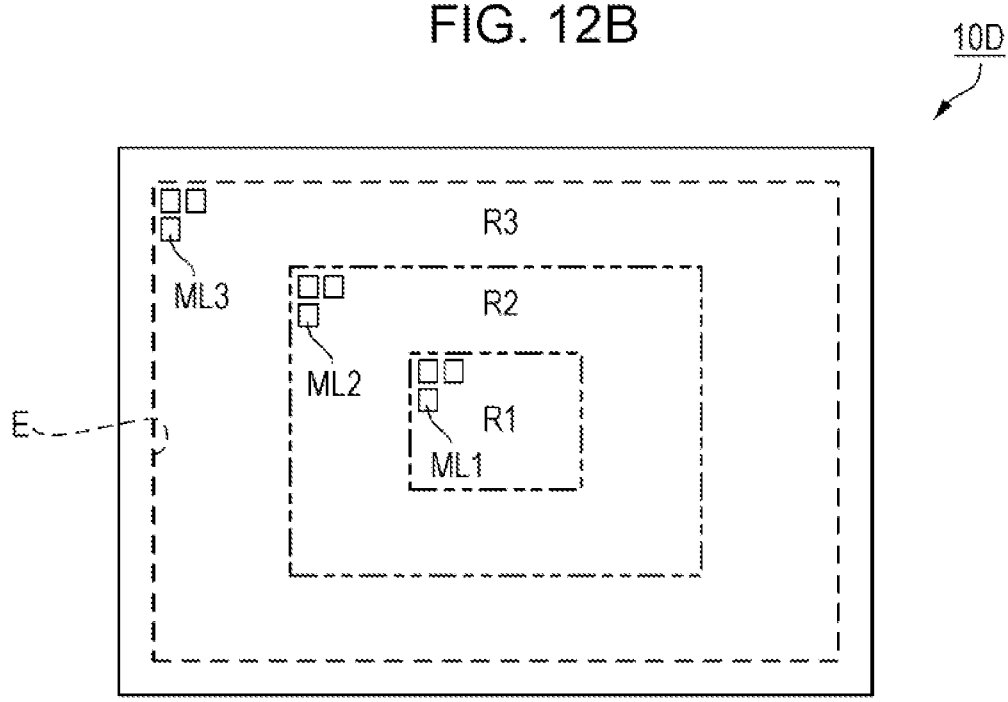

In addition, the configuration may have a non-display region F surrounding the periphery of the display region E, and include a microlens MLF as a third microlens arranged in the non-display region F, as in the microlens array substrate 10C according to the modification example 3 shown in FIG. 12A. FIGS. 12A and 12B are schematic cross-sectional views showing a configuration of a microlens array substrate according to a modification example.

As shown in FIG. 12A, the microlens array substrate 10C according to the modification example 3 has a non-display region F surrounding the periphery of the display region E. The non-display region F is a region not substantially contributing to display in a liquid crystal device, and having a dummy pixel electrode driven similarly to the pixel electrode 28 in the display region E. Such a dummy pixel electrode, for example, is provided for suppressing lowering of the image quality due to disturbance or the like of the driving waveform in the outer edge portion in the display region E. For example, an image signal displaying a black solid image is applied to a dummy pixel electrode, and light leakage from the peripheral edge of the display region E is suppressed by edging the periphery of the display region E in black. There are cases of an electrically floating state being set by insulating the dummy pixel electrode from the TFT.

In the microlens array substrate 10C according to the modification example 3, a microlens MLF (dummy microlens) is included as a third microlens in such a non-display region F. The shape of the microlens MLF is the same as the shape of the microlens ML3 positioned to the outer edges side of the display region E. That is, the shape of the concavity (not shown in the drawings) configuring the microlens MLF is the same as the shape of the concavity 12c configuring the microlens ML3. In so doing, it is possible for the layer thickness of the liquid crystal layer 40 for improving the flatness to be more uniform in the outer edge portion of the display region E of the microlens array substrate 10C and the periphery thereof, and since it is possible for the optical conditions, such as refraction of the incident light to be the same, it is possible for the image quality of the liquid crystal device 1 to be improved.

Modification Example 4

Although the microlens array substrate 10 according to the above embodiments has a configuration in which the collection efficiency of each microlens ML is set so as to become continuously larger from the microlens ML1 corresponding to the pixel P1 positioned at the center portion of the display region E in the liquid crystal device 1 towards the pixel P positioned furthest to the outer edge side in the each of the X direction, the Y direction, and a diagonal direction to the X direction and the Y direction, the present invention is not limited to such forms. The configuration may have the display region E partitioned into a plurality of regions from the center portion towards the outer edge sides as in the microlens array substrate 10D according to the modification example 4 shown in FIG. 12B, and the collection efficiency for each region be different.

As shown in FIG. 12B, the microlens array substrate 10D according to the modification example 4 has a region R1 positioned at the center portion in the display region E, a region R2 surrounding the periphery of the region R1 and a region R3 positioned furthered to the outer edge side in the display region E surrounding the periphery of the region R2. Then, a plurality of microlenses ML1 is arranged in the region R1, a plurality of microlenses ML2 is arranged in the region R2, and a plurality of microlenses ML3 is arranged in the region R3.

The collection efficiency of each microlens ML on the microlens array substrate 10D according to the modification example 4 becomes lower in a stepwise manner for each region R1, R2 and R3 from the outer edge side towards the center portion in each direction of the X direction, the Y direction and the diagonal direction. Accordingly, even in the microlens array substrate 10D according to the modification example 4, it is possible for unevenness in the illuminance between the center portion and the outer edge sides to be alleviated compared to the microlens array substrate of the related art.

Moreover, in FIG. 12B, as regions with the same collection efficiency for the microlenses ML, the three regions of regions R1, R2, and R3 are partitioned from the center portion towards the outer edge sides; however, partitioning into four or more regions may be performed, and it is preferable to perform partitioning into even greater numbers of regions. As the number of regions partitioned becomes greater, it is possible for the differences in illuminance causing differences in the collection efficiency of the microlenses ML between neighboring regions to become more difficult to discern.

Modification Example 5

Although the manufacturing method of the microlens array substrate according to the above embodiments has a configuration forming the concavities 12a, 12b, and 12c by isotropically etching the control film 71 and the substrate 11 via the opening portions 72a, 72b, and 72c of the mask layer 72, as shown in FIG. 5D, the present invention is not limited to these forms. The manufacturing method of the microlens array substrate may have a configuration forming concavities in the substrate 11 by transferring concavities formed on a resist film to the substrate 11, as shown in FIGS. 13A to 13D.

Figure 13A:
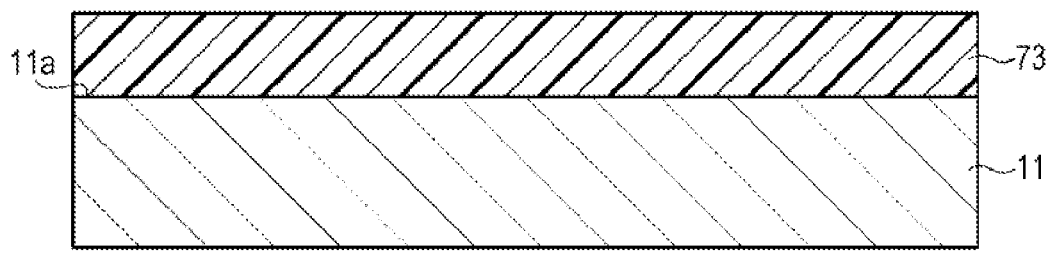
FIGS. 13A to 13D are schematic cross-sectional views showing a manufacturing method of a microlens array substrate according to a modification example.
Figure 13B:
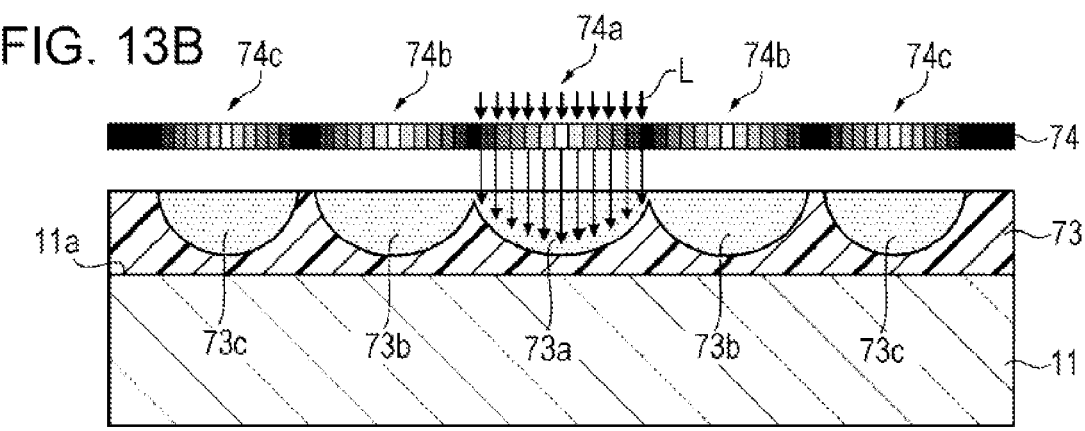

FIGS. 13A to 13D are schematic cross-sectional views showing a manufacturing method of a microlens array substrate according to a modification example. In the manufacturing method of the microlens array substrate according to the modification example 5, the resist layer 73 is formed on the substrate 11, as shown in FIG. 13A. Subsequently, as shown in FIG. 13B, the resist layer 73 is exposed using a mask 74 in which the transmissivity to light is changed by corresponding to the shape of the concavities 12a, 12b, and 12c formed in the resist layer 73 on the substrate 11.

The mask 74, for example, is a grayscale mask, such as a HEBS mask, and gradation is obtained in each of the light transparent regions 74a, 74b, and 74c by making the transmissivity to light different in the shape of substantially concentric circles from the planar center position towards the outer circumference. In addition, the size of substantially concentric circular regions with the same transmissivity to light is the largest at the light transparent region 74a positioned at the center portion of the mask 74, and becomes smaller towards the outer edge side in the order of the light transparent regions 74b and 74c. By performing irradiation of laser light L via such a mask 74, exposure regions 73a, 73b, and 73c are formed in the resist layer 73 corresponding to the light transparent regions 74a, 74b, and 74c of the mask 74.

Moreover, in the exposure of the resist layer 73, a multi-step exposure using a plurality of masks may be used in which the areas of the light transparent regions are made different in a stepwise manner corresponding to the shape of the concavities 12a, 12b, and 12c. In addition, an area gradation mask may be used having a fine opening area distributing corresponding to the concavities 12a, 12b, and 12c in a chromium mask.

Figure 13C:
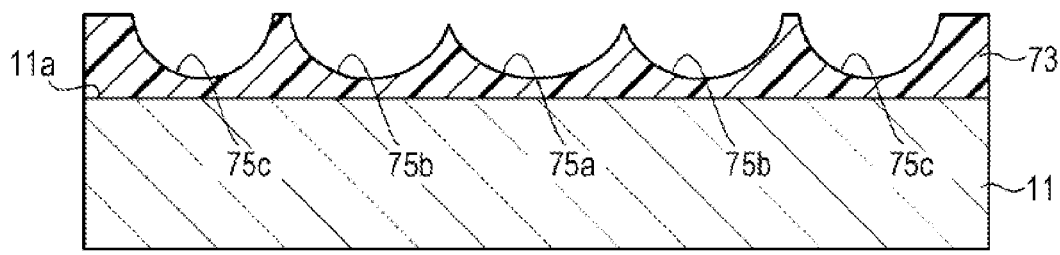

Next, as shown in FIG. 13C, through removing the exposure regions 73a, 73b, and 73c by subjecting the resist layer 73 to a development process, the concavities 75a, 75b, and 75c that are a base for the concavities 12a, 12b, and 12c are formed in the resist layer 73.

Figure 13D:
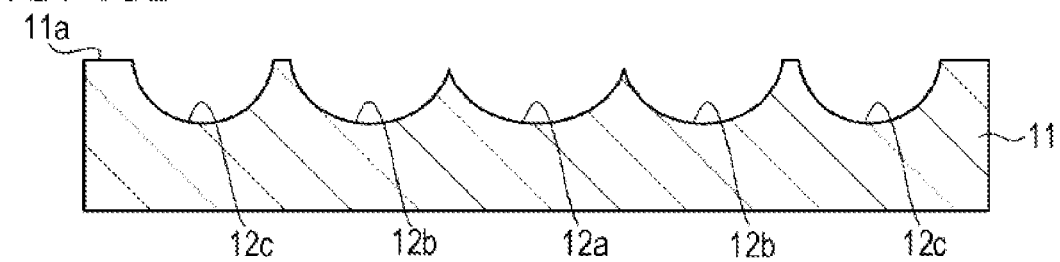

Next, as shown in FIG. 13D, anisotropic etching, such as dry etching, for example, is performed from the resist layer 73 to the substrate 11 in which the concavities 75a, 75b, and 75c are formed. In so doing, the concavities 75a, 75b, and 75c formed in the resist layer 73 are transferred to the substrate 11, and the concavities 12a, 12b, and 12c are formed in the substrate 11.

Modification Example 6

The electro-optical device including the microlens array substrate according to the above embodiments is not limited to the liquid crystal device 1. It is possible to suitably use the microlens array substrate according to the above embodiments, for example, in an image sensor, an integral lens or the like. In addition, it is also possible to suitably use the microlens array substrate according to the above embodiments, in digital light processing (DLP) including a digital mirror device (DMD).

The entire disclosure of Japanese Patent Application No. 2012-264023, filed Dec. 3, 2012 is expressly incorporated by reference herein.

What is claimed is:

1. An electro-optical device comprising:
   a pair of substrates;
   a first microlens;
   a second microlens positioned further to an outside edge side of one substrate of the pair of substrates than the first microlens in a display region of at least one substrate of the pair of substrates; and
   a third microlens positioned further to the outside edge side of one substrate of the pair of substrates than the second microlens and the first microlens in the display region of at least one substrate of the pair of substrates,
      wherein the collection efficiency of the first microlens is lower than the collection efficiency of the second microlens, and
      the collection efficiency of the second microlens is lower than the collection efficiency of the third microlens.

2. The electro-optical device according to claim 1, wherein the curvature of the first microlens is smaller than the curvature of the second microlens.

3. The electro-optical device according to claim 1, wherein the diameter of the first microlens is smaller than the diameter of the second microlens.

4. The electro-optical device according to claim 1, wherein the inclination angle of with respect to one face of a peripheral edge portion of the first microlens is smaller than the inclination angle with respect to the one face of the peripheral edge portion of the second microlens.

5. The electro-optical device according to claim 1 further comprising a liquid crystal layer interposed between the pair of substrates.

6. The electro-optical device according to claim 1, further comprising the third microlens arranged corresponding to a non-display region surrounding the display region,
   wherein the shape of the third microlens is the same as the shape of the second microlens.

7. The electro-optical device according to claim 1, wherein microlenses having the same collection efficiency as one another are arranged on the other substrate of the pair of substrates.

8. The electro-optical device according to claim 1, wherein microlenses having the same collection efficiency as one another are arranged on one substrate of the pair of substrates.

9. An electronic apparatus comprising the electro-optical device according to claim 1.

* * * * *